United States Patent
Yamada et al.

(10) Patent No.: US 10,604,158 B2
(45) Date of Patent: Mar. 31, 2020

(54) DRIVING SUPPORT DEVICE, DRIVING SUPPORT SYSTEM AND DRIVING SUPPORT METHOD

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 254 days.

(21) Appl. No.: 15/913,660

(22) Filed: Mar. 6, 2018

(65) Prior Publication Data

US 2018/0194367 A1 Jul. 12, 2018

Related U.S. Application Data

(63) Continuation of application No. 15/328,878, filed as application No. PCT/JP2016/003381 on Jul. 19, 2016, now Pat. No. 9,944,298.

(30) Foreign Application Priority Data

Jul. 31, 2015 (JP) .................. 2015-152849

(51) Int. Cl.
*B60W 50/10* (2012.01)
*B62D 6/00* (2006.01)
(Continued)

(52) U.S. Cl.
CPC ............. *B60W 50/10* (2013.01); *B60K 35/00* (2013.01); *B60K 37/06* (2013.01);
(Continued)

(58) Field of Classification Search
CPC ................ B60W 50/10; B60W 50/14; B60W 30/18163; B60W 50/087;
(Continued)

(56) References Cited

U.S. PATENT DOCUMENTS

2011/0251768 A1 10/2011 Luo et al.
2012/0022716 A1 1/2012 Kitahama et al.
(Continued)

FOREIGN PATENT DOCUMENTS

JP  2004-050923 A  2/2004
JP  2004-058918 A  2/2004
(Continued)

OTHER PUBLICATIONS

International Search Report, dated Sep. 13, 2016, for corresponding International Application PCT/JP2016/003381, 2 pages.

*Primary Examiner* — Alan D Hutchinson
(74) *Attorney, Agent, or Firm* — Seed IP Law Group LLP

(57) ABSTRACT

A driver can intuitively and conveniently perform an operation for instructing a traffic lane change to a vehicle. In a driving support device 10, an image output unit 14a outputs, to a display unit 31, an image containing an own vehicle object representing an own vehicle and a plurality of traffic lanes. An operation signal input unit 14b receives an operation of a user for moving the own vehicle object in the image displayed on the display unit 31 from a first traffic lane to a second traffic lane. A command output unit 14c outputs, to an automatic driving control unit 20 that controls automatic driving, a command for instructing the change of a traveling traffic lane of the own vehicle from the first traffic lane to the second traffic lane when the operation is received.

7 Claims, 27 Drawing Sheets

(51) Int. Cl.
*G01C 21/36* (2006.01)
*B60K 35/00* (2006.01)
*B60W 50/14* (2020.01)
*B60K 37/06* (2006.01)
*B60W 30/18* (2012.01)
*B60W 50/08* (2020.01)
*G05D 1/02* (2020.01)
*G06F 3/0481* (2013.01)
*G06F 3/0486* (2013.01)
*G06F 3/0488* (2013.01)
*G08G 1/16* (2006.01)
*G01S 19/24* (2010.01)

(52) U.S. Cl.
CPC .... *B60W 30/18163* (2013.01); *B60W 50/087* (2013.01); *B60W 50/14* (2013.01); *B62D 6/00* (2013.01); *G01C 21/3658* (2013.01); *G05D 1/0212* (2013.01); *G06F 3/0486* (2013.01); *G06F 3/04817* (2013.01); *G06F 3/04883* (2013.01); *B60K 2370/11* (2019.05); *B60K 2370/146* (2019.05); *B60K 2370/1438* (2019.05); *B60K 2370/1464* (2019.05); *B60K 2370/1468* (2019.05); *B60K 2370/152* (2019.05); *B60K 2370/166* (2019.05); *B60K 2370/171* (2019.05); *B60K 2370/175* (2019.05); *B60K 2370/176* (2019.05); *B60K 2370/188* (2019.05); *B60K 2370/1868* (2019.05); *B60K 2370/21* (2019.05); *B60K 2370/31* (2019.05); *B60K 2370/48* (2019.05); *B60W 2050/146* (2013.01); *B60W 2420/42* (2013.01); *B60W 2420/52* (2013.01); *B60W 2540/04* (2013.01); *B60W 2710/18* (2013.01); *B60W 2710/20* (2013.01); *B60W 2720/10* (2013.01); *B60W 2720/24* (2013.01); *B60W 2750/40* (2013.01); *G01S 19/24* (2013.01); *G08G 1/167* (2013.01)

(58) Field of Classification Search
CPC ....... B60W 2050/146; B60W 2540/04; B60W 2420/42; B60W 2420/52; B60W 2710/18; B60W 2710/20; B60W 2720/10; B60W 2720/24; B60W 2750/40; B62D 6/00; G01C 21/3658; B60K 35/00; B60K 37/06; B60K 2370/31; B60K 2370/146; B60K 2370/166; B60K 2370/171; B60K 2370/175; B60K 2370/1464; B60K 2370/188; B60K 2370/176; B60K 2370/21; B60K 2370/1468; B60K 2370/1438; B60K 2370/48; B60K 2370/11; B60K 2370/152; B60K 2370/1868; G05D 1/0212; G06F 3/04817; G06F 3/0486; G06F 3/04883; G08G 1/167; G01S 19/24

See application file for complete search history.

(56) References Cited

U.S. PATENT DOCUMENTS

| | | |
|---|---|---|
| 2012/0173069 A1 | 7/2012 | Tsimhoni et al. |
| 2014/0320432 A1 | 10/2014 | Muramatsu et al. |
| 2015/0006013 A1 | 1/2015 | Wimmer et al. |
| 2015/0032290 A1 | 1/2015 | Kitahama et al. |
| 2017/0032688 A1 | 2/2017 | Nakayama |

FOREIGN PATENT DOCUMENTS

| | | |
|---|---|---|
| JP | 2004-178194 A | 6/2004 |
| JP | 2005-041433 A | 2/2005 |
| JP | 2007-226322 A | 9/2007 |
| JP | 2009-036565 A | 2/2009 |
| JP | 2010-198578 A | 9/2010 |
| JP | 2012-076483 A | 4/2012 |
| JP | 2013-129328 A | 7/2013 |
| JP | 2014-225245 A | 12/2014 |
| JP | 2015-011458 A | 1/2015 |
| JP | 2015-081057 A | 4/2015 |
| JP | 2015-141641 A | 8/2015 |
| JP | 2015-199439 A | 11/2015 |

DRIVING SUPPORT DEVICE, DRIVING SUPPORT SYSTEM AND DRIVING SUPPORT METHOD

CROSS-REFERENCE TO RELATED APPLICATIONS

This application is a continuation of U.S. patent application Ser. No. 15/328,878, filed Jan. 24, 2017, which is a U.S. national stage application of the PCT International Application No. PCT/JP2016/003381 filed on Jul. 19, 2016, which claims the benefit of foreign priority of Japanese patent application No. 2015-152849 filed on Jul. 31, 2015, the contents all of which are incorporated herein by reference.

FIELD OF THE INVENTION

The present disclosure relates to a technique that supports a driving operation instruction of a driver to a vehicle during automatic driving.

DESCRIPTION OF THE REALTED ART

In recent years, developments in automatic driving of a car have progressed. For automatic driving, automation levels defined in 2013 by the National Highway Traffic Safety Administration (NHTSA) are classified as no automation (level 0), specific-function automation (level 1), complex-function automation (level 2), semi-automatic driving (level 3), and fully-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Automation level 4 is a fully-automatic driving system that automatically performs all of acceleration, deceleration, and steering, and thus a driver is not involved in a driving operation.

Automation level 3 is a semi-fully-automatic driving system that automatically performs all of acceleration, deceleration, and steering, but if necessary, a driving operation is performed by a driver.

As a form of automatic driving, a form in which a driver does not operate an existing driving operation unit such as a steering, an accelerator pedal, or the like but instructs a specific driving operation such as a traffic lane change, passing, following traveling, or the like to a vehicle by issuing a command to a vehicle is considered. In this form, a user interface in which there are fewer erroneous operations is required.

CITATION LIST

Patent Literature

PTL 1: Japanese Patent Unexamined Publication No. 2013-129328

SUMMARY OF THE INVENTION

In a design in which each switch is designed for a specific driving operation such as a traffic lane change, passing, following traveling, or the like, the correspondence between a switch operation and automatic traveling control is not intuitive, and selecting an instruction among many switches or selecting a changed function with reduced switches according to a situation is a complex task. For this reason, there is a problem in that a wide range of users including a person who has not been driving up to now, a person who wants to continue to drive even though the driving capability of the person has been reduced, or the like, cannot use an automatic driving vehicle without training.

The present disclosure has been made in consideration of such a situation, and an object thereof is to provide a technique that allows a driver to intuitively and conveniently instruct a specific driving operation to a vehicle.

In order to solve the above-described problems, a driving support device according to an aspect of the present disclosure includes: an image output unit that outputs, to a display unit, an image containing an own vehicle object representing an own vehicle and a plurality of traffic lanes; and an operation signal input unit that receives an operation of a user for moving the own vehicle object in the image displayed on the display unit from a first traffic lane to a second traffic lane. The driving support device includes a command output unit that outputs, to an automatic driving control unit that controls automatic driving, a command for instructing the change of a traveling traffic lane of the own vehicle from the first traffic lane to the second traffic lane when the operation is received.

As another aspect of the present disclosure, an aspect in which the present disclosure is converted into a device, a system, a method, a program, a recording medium in which a program is recorded, and a vehicle equipped with the device by arbitrarily combining the above components is also effective.

According to the present disclosure, a driver can intuitively and conveniently instruct a specific driving operation to a vehicle.

DETAILED DESCRIPTION OF THE PREFERRED EMBODIMENTS

Figure 1:
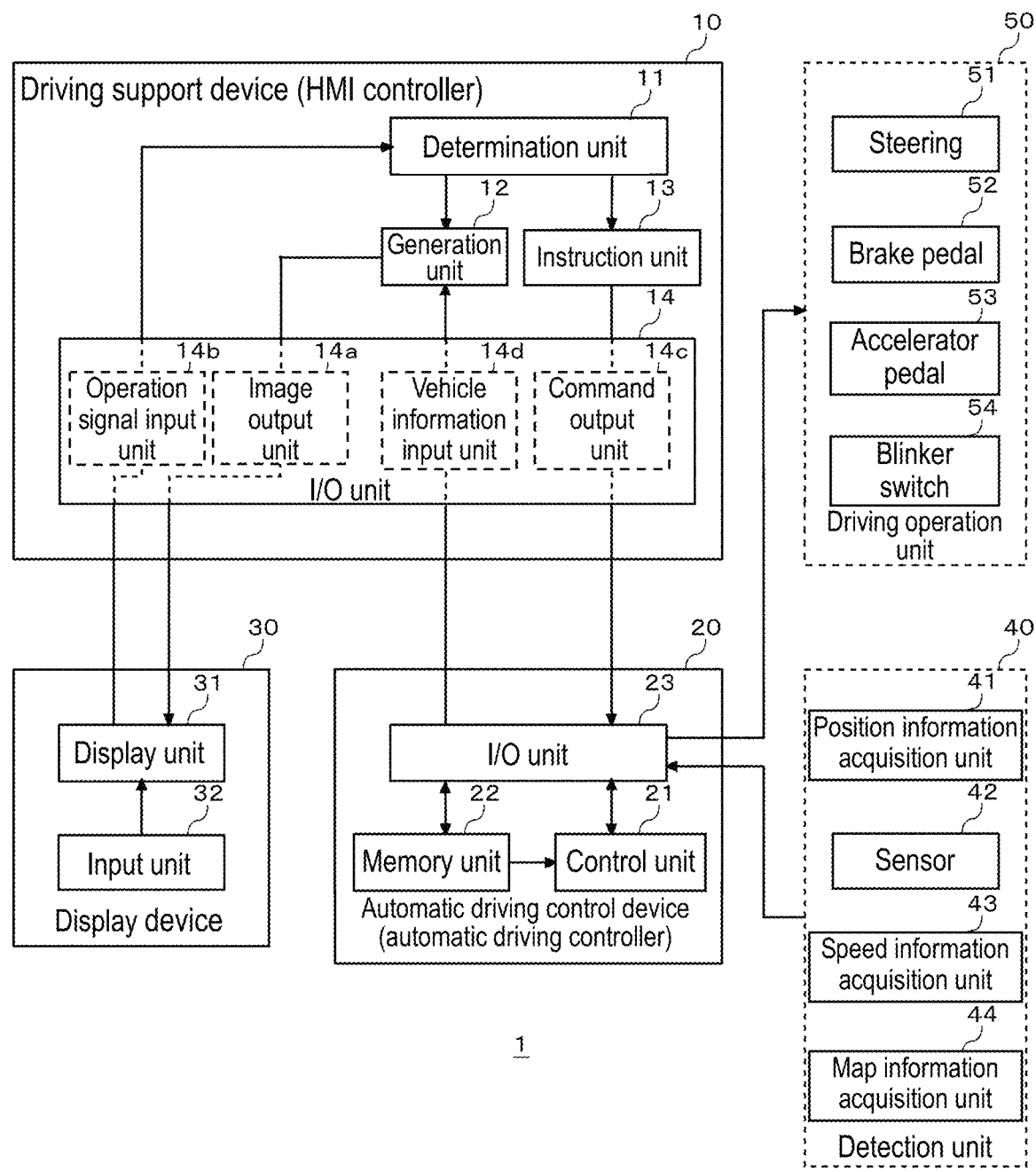
FIG. 1 is a block diagram illustrating a configuration of a vehicle according to an embodiment of the present disclosure.

Hereinafter, embodiments of the present invention will be described with reference to the drawings. FIG. 1 is a block diagram illustrating a configuration of vehicle 1 according to an embodiment of the present invention, and illustrates a configuration related to automatic driving. Vehicle 1 (an own vehicle) with an automatic driving mode includes driving support device (human machine interface (HMI)) 10, automatic driving control device (automatic driving controller) 20, display device 30, detection unit 40, and driving operation unit 50.

Display device 30 includes display unit 31 and input unit 32. Display device 30 may be a head unit such as a car navigation system, a display audio, or the like, a portable terminal device such as a smart phone, a tablet, or the like, or a dedicated console terminal device.

Display unit 31 is a liquid crystal display, an organic electroluminescent (EL) display, or a head-up display (HUD). Input unit 32 is a user interface that receives an input of a user. Display unit 31 and input unit 32 may be an integrated touch panel display. Input unit 32 may have an input device such as a mouse, a stylus pen, a trackball, or the like for assisting the gesture input. A pen that emits visible light or infrared light may also be used.

Display unit 31 and input unit 32 may be physically separated from each other, instead of being an integrated touch panel display. For example, input unit 32 includes a sensor such as a camera or the like, and may be a non-contact type input device that allows a gesture operation input in the air. For example, an operation method that starts to drag with a gesture by pointing to a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as universal serial bus (USB), Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, a light detection and ranging (laser imaging detection and ranging, LIDAR), a temperature sensor, a pressure sensor, a humidity sensor, an illumination sensor, or the like is mounted. As a situation outside the vehicle, a road situation in which the own vehicle travels that includes traffic lane information, an environmental situation including weather, and an own vehicle peripheral situation are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. In FIG. 1, an operation unit when these controls are performed manually is drawn. Information indicating that driving operation unit 50 is slightly moved by a driver in a manual way may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, at least one of an engine rotation speed and a motor rotation speed is controlled via an accelerator actuator. In a pure gas car, the engine rotation speed is controlled. In a pure electric vehicle, the motor rotation speed is controlled. In a hybrid car, both of the engine rotation speed and the motor rotation speed are controlled. The accelerator actuator can be electronically controlled by at least one of an engine ECU and a motor ECU.

Blinker switch 54 is an operation unit for blinking a blinker so as to notify a course of the vehicle to the outside. When blinker switch 54 is turned on/off by a driver, the blinker is turned on/off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller respectively transmits a state signal indicating the state of each of a steering, a brake, an engine, a motor, and a blinker lamp to automatic driving control device 20.

In the automatic driving mode, each of the steering ECU, the brake ECU, the engine ECU, and the motor ECU drives the corresponding actuator according to a control signal supplied from automatic driving control device 20. In a manual driving mode, a configuration in which an instruction is directly transferred from each of steering 51, brake pedal 52, and accelerator pedal 53 to the corresponding actuator in a mechanical way may be employed, or a configuration in which electronic control intervenes via the corresponding ECU may be employed. The blinker controller turns on/off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit (I/O unit) 23. The configuration of control unit 21 may be realized by cooperation between hardware resources and software resources or only hardware resources. As the hardware resources, a processor, a read only memory (ROM), a random access memory (RAM), and other large scale integrated (LSI) circuits can be used, and as software resources, an operating system, an application, and a program such as a firmware or the like can be used. Memory unit 22 includes a non-volatile recording medium such as a flash memory or the like. Input-output unit 23 performs various communication controls according to various communication formats.

Control unit 21 calculates a control value for controlling an automatic control target such as a traveling direction of vehicle 1 by applying various parameter values collected from detection unit 40 and various ECUs to an automatic driving algorithm. Control unit 21 transfers the calculated control value to the ECU or controller of each control target. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, generation unit 12, instruction unit 13, and input-output unit (I/O unit) 14. Determination unit 11, generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit 14 performs various communication controls according to various communication formats. Input-output unit 14 includes image output unit 14a, operation signal input unit 14b, command output unit 14c, and vehicle information input unit 14d. Image output unit 14a outputs an image generated by generation unit 12 to display unit 31. Operation signal input unit 14b receives an operation signal that is input from input unit 32 by an operation of a driver, a passenger, or a user outside the vehicle, and outputs the operation signal to determination unit 11. Command output unit 14c outputs the command instructed by instruction unit 13 to automatic driving controller 20. Vehicle information input unit 14d receives detection data acquired by detection unit 40 or vehicle information generated by automatic driving controller 20, and outputs the detection data or the vehicle information to generation unit 12.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
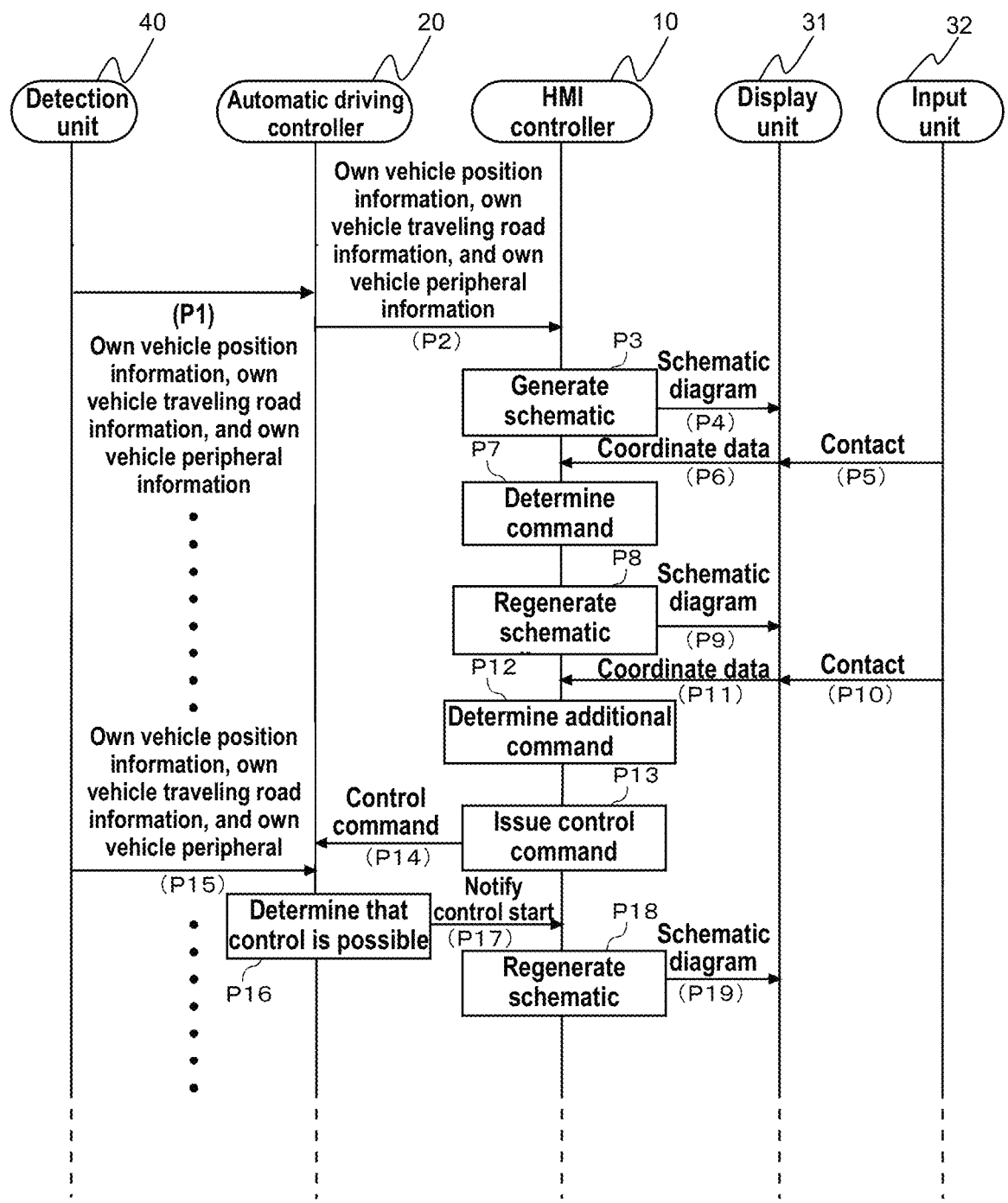
FIG. 2 is a diagram illustrating an example of a basic sequence of detection unit, automatic driving controller, HMI controller, display unit, and input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects own vehicle position information, own vehicle traveling road information including traffic lane information, and own vehicle peripheral information, and outputs the detected information to automatic driving controller 20 (P1). Automatic driving controller 20 outputs the own vehicle position information acquired from detection unit 40, the own vehicle traveling road information, and the own vehicle peripheral information to HMI controller 10 (P2). HMI controller 10 generates a schematic diagram including the own vehicle and the own vehicle peripheral situation based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines a type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 performs additional command processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the own vehicle position information, the own vehicle traveling road information, and the own vehicle peripheral information, and outputs the information to automatic driving controller 20 (P15). Automatic driving controller 20 determines whether or not control instructed by the command issued from HMI controller 10 is executable (P16), based on the corresponding information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a specific control value for controlling driving operation unit 50 that performs the issued command by applying various parameter values collected from detection unit 40 or various ECUs to an automatic driving algorithm, and transfers the control value to the ECU or controller of each control target, the control value being an automatic control target such as a traveling direction of vehicle 1. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that performing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
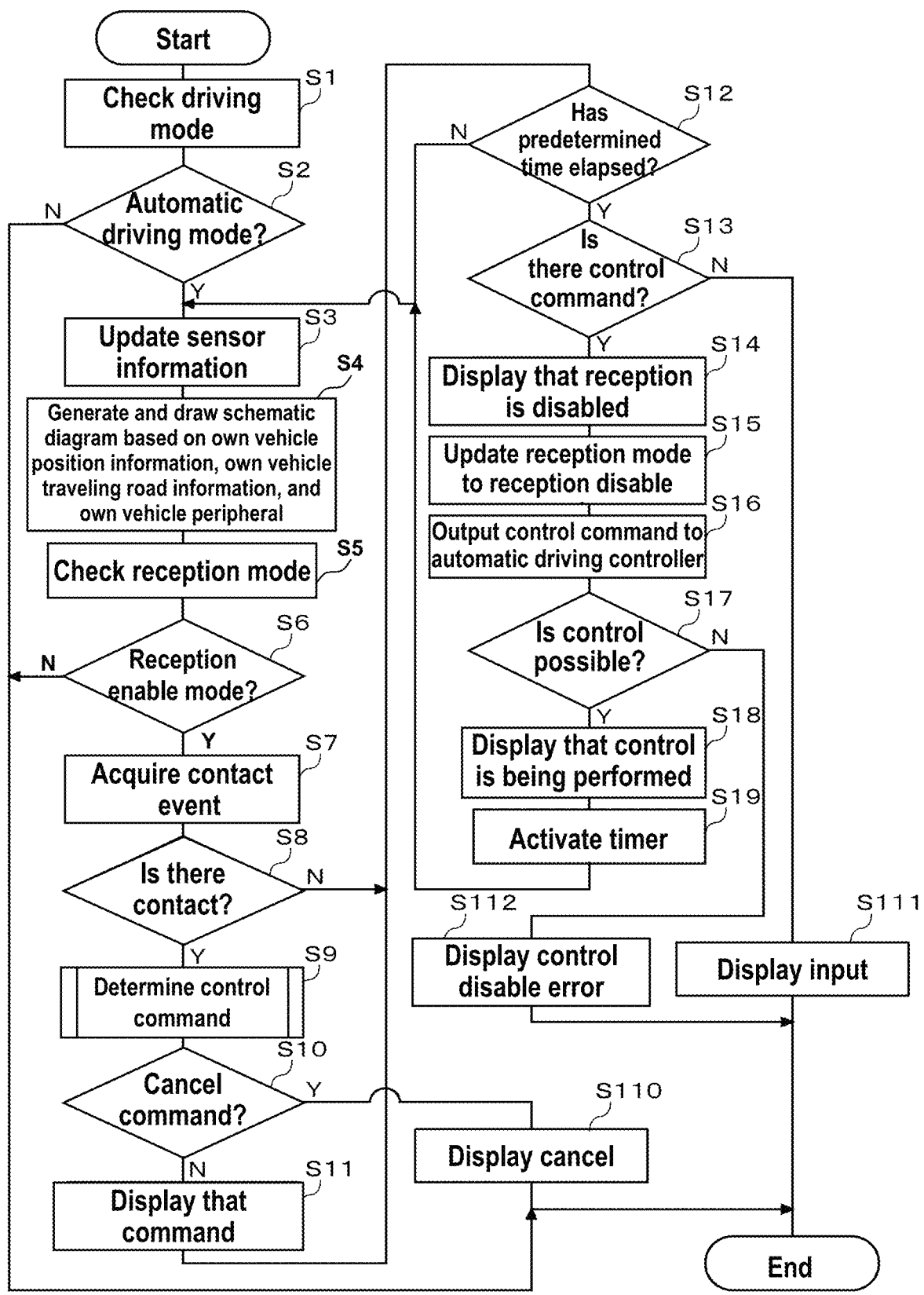
FIG. 3 is a diagram illustrating an example of a basic flowchart for explaining processing of HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Generation unit 12 of HMI controller 10 generates a schematic diagram including the own vehicle and the own vehicle peripheral situation based on the own vehicle position information, the own vehicle traveling road information including traffic lane information, and the own vehicle peripheral information that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), a predetermined time elapse determination processing (S12) to be described later is performed. In a case where there is a contact to input unit 32 by a user (Y in S8), determination unit 11 determines a control command according to a gesture operation input by a user (S9). The details of the determination processing will be described later.

In a case where the control command determined in step S9 is not a cancel command (N in S10), generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9, an input error is displayed (S111), and the process ends. Automatic driving controller 20 periodically detects the own vehicle position information, the own vehicle traveling road information, and the own vehicle peripheral information from detection unit 40. Since the own vehicle peripheral situation constantly changes, after the control command is output to automatic driving controller 20, there is a case where it is determined that the control command is not executable. For example, after a following instruction, there is a case where other cars interrupt between the own vehicle and another vehicle. In a case where it is determined that the control command is executable by automatic driving controller 20 (Y in S17), generation unit 12 displays that the control is being performed on display unit 31 (S18), and starts counting by activating a timer (S19). In a case where it is determined that the control is not executable by automatic driving controller 20 (N in S17), generation unit 12 displays a control disable error on display unit 31 (S112).

Figure 4:
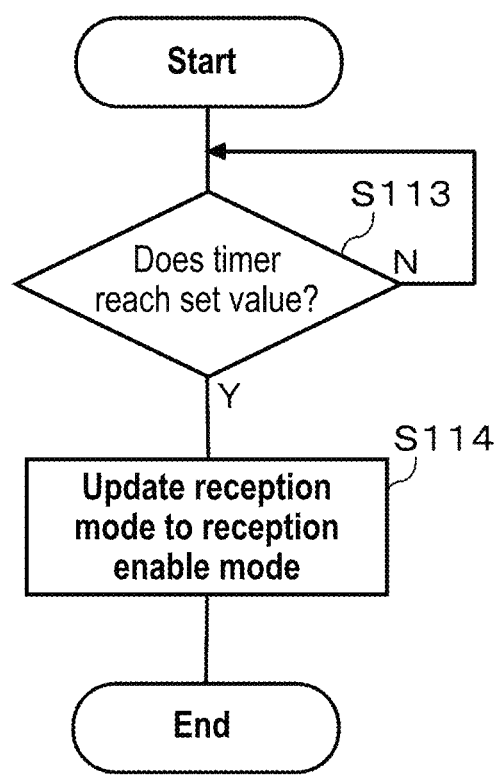
FIG. 4 is a flowchart for explaining update processing of a reception mode.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the own vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Hereinafter, in this embodiment, as a control command, an example in which a control command for instructing the change of the traffic lane of the own vehicle is issued will be described. A user inputs a gesture operation for instructing the change of the traffic lane of the own vehicle to input unit 32. A specific example of the gesture operation will be described later.

Figure 5:
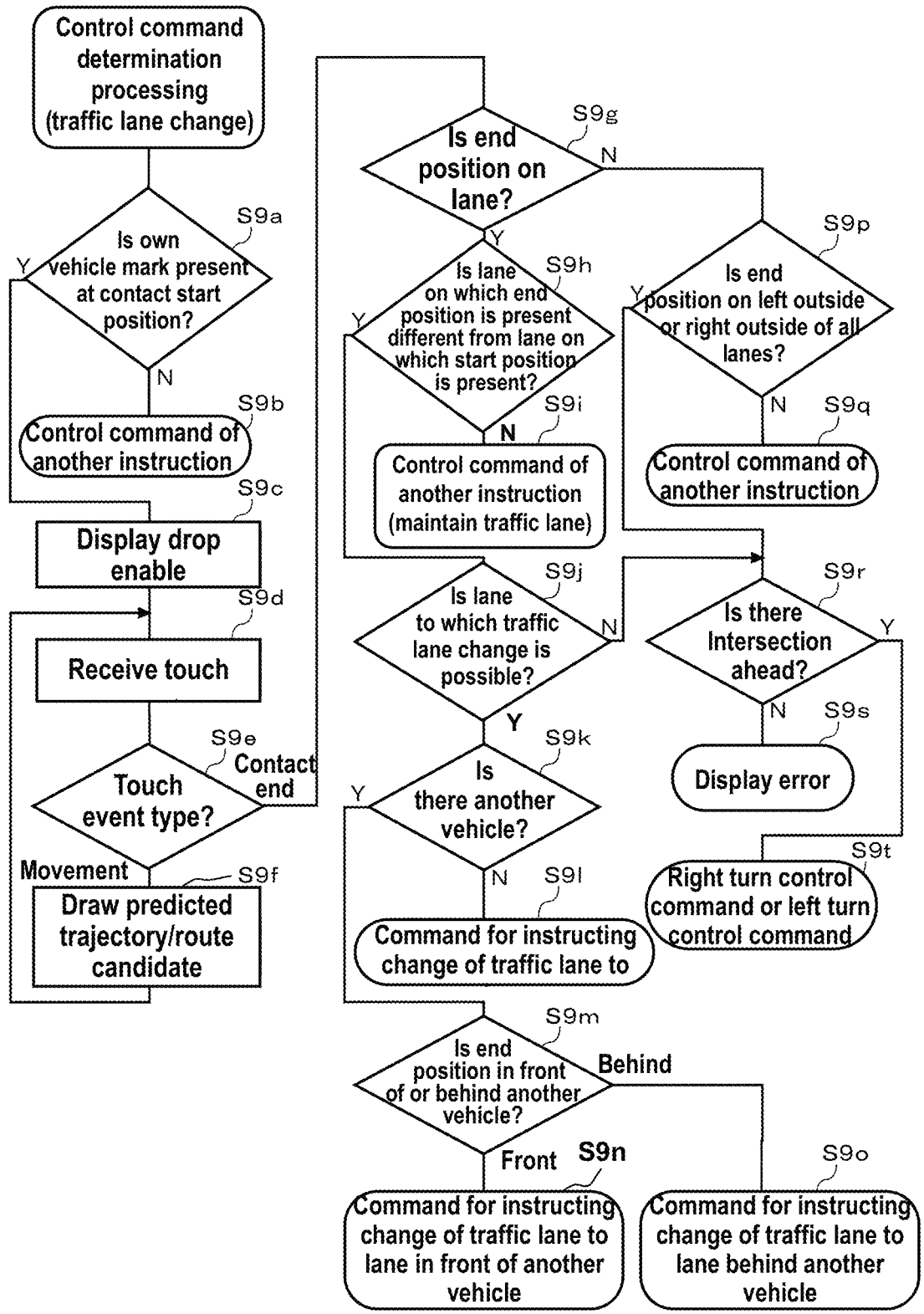
FIG. 5 is a flowchart illustrating an example of determination processing in a case where a gesture operation for instructing a traffic lane change is input in step S9 of FIG. 3.

FIG. 5 is a flowchart illustrating an example of determination processing in a case where a gesture operation for instructing the change of a traveling traffic lane of an own vehicle is input in step S9 of FIG. 3. Determination unit 11 of HMI controller 10 determines whether or not an own vehicle mark is present at a contact start position (S9*a*). In a case where the own vehicle mark is not present at the contact start position (N in S9*a*), determination unit 11 determines that the gesture operation is a control command of another instruction other than a traffic lane change instruction (S9*b*). In a case where the own vehicle mark is present at the contact start position (Y in S9*a*), generation unit 12 draws a drop enable area in the schematic diagram, and displays the area on display unit 31 (S9*c*). A specific example of the drop enable area will be described later.

Determination unit 11 receives a touch event generated in input unit 32 (S9*d*), and determines the type of the touch event (S9*e*). In a case where the type of the touch event is a movement (movement in S9*e*), generation unit 12 draws a prediction trajectory/route candidate of vehicle 1 in the schematic diagram, and the prediction trajectory/route candidate of vehicle 1 is displayed on display unit 31 (S9*f*). The details of processing for drawing a predicted trajectory/route candidate will be described later.

In a case where the type of the touch event is a contact end (contact end in S9*e*), determination unit 11 determines whether or not a contact end position is on a lane (S9*g*). In a case where the contact end position is on a lane (Y in S9*g*), determination unit 11 determines whether or not the lane on which the contact end position is present is different from the lane on which the contact start position is present (S9*h*). In a case where the lane on which the contact end position is present is not different from the lane on which the contact start position is present (in a case where the lanes are the same lane) (N in S9*h*), determination unit 11 determines that the gesture operation is a control command of another instruction other than a traffic lane change instruction (S9*i*). In this case, the traveling traffic lane of the own vehicle is maintained.

In a case where the lane on which the contact end position is present is different from the lane on which the contact start position is present (Y in S9*h*), determination unit 11 determines whether or not the lane on which the contact end position is present is the lane to which a traffic lane change is possible (S9*j*). In a case where the lane on which the contact end position is present is the lane to which a traffic lane change is possible (Y in S9*j*), determination unit 11 determines whether or not there is another vehicle on the lane on which the contact end position is present (S9*k*). In a case where there is no another vehicle on the lane on which the contact end position is present (N in S9*k*), determination unit 11 determines that the gesture operation is a traffic lane change instruction command for instructing the traffic lane change to the lane (S9*l*).

In a case where there is another vehicle on the lane on which the contact end position is present (Y in S9*k*), determination unit 11 determines whether or not the contact end position is in front of or behind the another vehicle (S9*m*). In a case where the contact end position is in front of the another vehicle (front in S9*m*), determination unit 11 determines that the gesture operation is a traffic lane change instruction command for instructing the traffic lane change to the lane in front of the another vehicle (S9*n*). In a case where the contact end position is behind the another vehicle (behind in S9*m*), determination unit 11 determines that the gesture operation is a traffic lane change instruction command for instructing the traffic lane change to the lane behind the another vehicle (S9*o*).

In step S9*g*, in a case where the contact end position is not on a lane (N in S9*g*), determination unit 11 determines whether or not the contact end position is on the left outside or the right outside of all lanes (S9*p*). In a case where the contact end position is not on the left outside or the right outside of all lanes (N in S9*p*), determination unit 11 determines that the gesture operation is a control command of another instruction other than a traffic lane change instruction (S9*q*). In a case where the contact end position is on the left outside or the right outside of all lanes (Y in S9*p*), determination unit 11 determines whether or not there is an intersection ahead (S9*r*). In a case where there is no intersection ahead (N in S9*r*), generation unit 12 displays an error message on display unit 31 (S9*s*). In a case where there is an intersection ahead (Y in S9*r*), determination unit 11 determines that the gesture operation is a right turn instruction command or a left turn instruction command (S9*t*). In a case where the contact end position is on the right outside of all lanes, the gesture operation is a right turn instruction command. In a case where the contact end position is on the left outside of all lanes, the gesture operation is a left turn instruction command. In the processing of step S9*j*, in a case where the lane on which the contact end position is present is not the lane to which a traffic lane change is possible (N in S9*j*), the process transitions to step S9*r*, and determination unit 11 determines whether or not there is an intersection ahead (S9*r*).

Hereinafter, a specific example of the gesture operation that is used at the time of the traffic lane change will be described. In the following examples, it is assumed that a touch panel display in which display unit 31 and input unit 32 are integrated is used.

Figure 6:
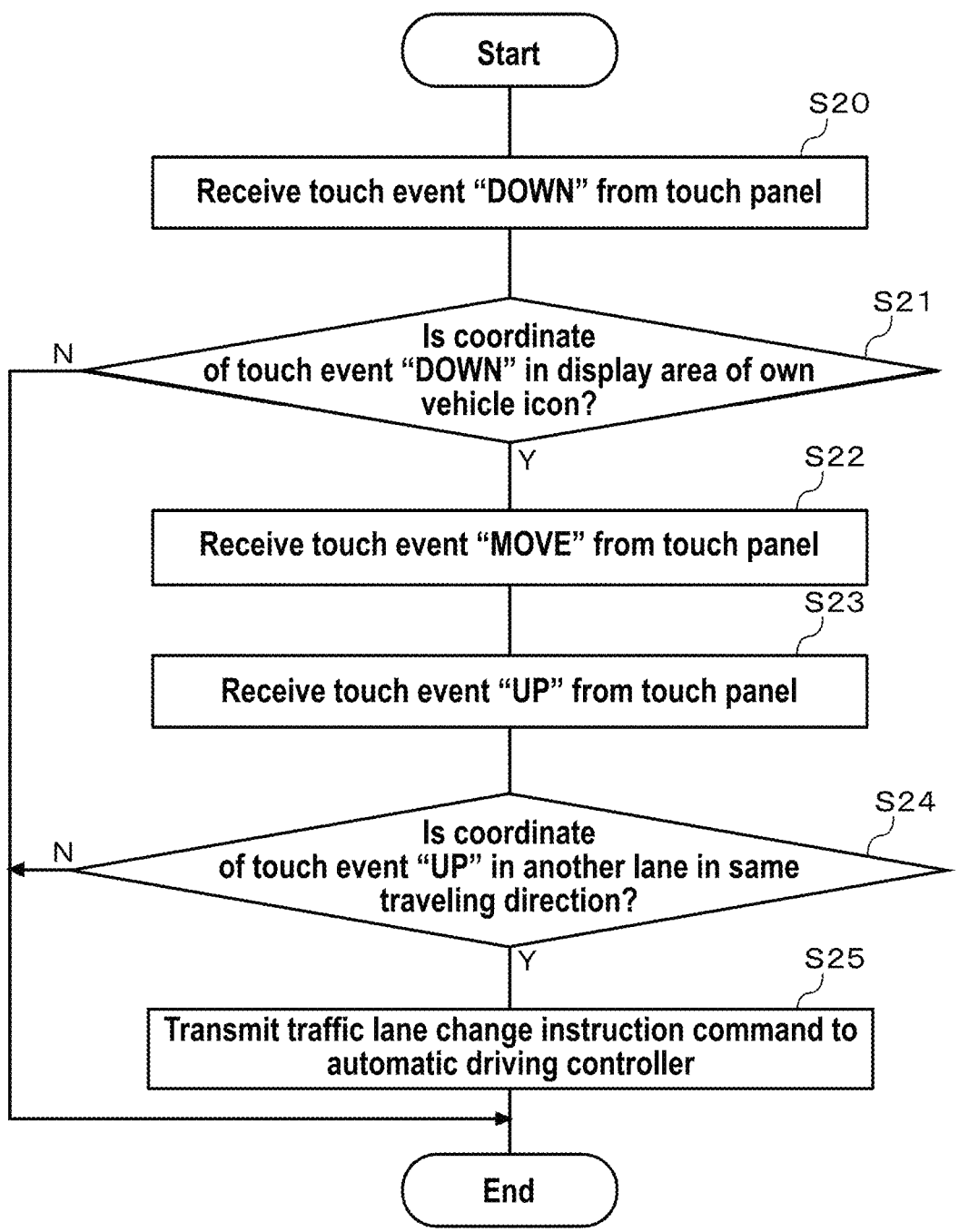
FIG. 6 is a flowchart illustrating a first processing example of issuing a traffic lane change instruction command by a gesture operation.

FIG. 6 is a flowchart illustrating a first processing example of issuing a traffic lane change instruction command by a gesture operation. Determination unit 11 of HMI controller 10 receives a touch event "DOWN" from the touch panel (S20). The touch event "DOWN" is an event representing a contact state change on the touch panel from a non-contact state to a contact state by a finger or a pen. Determination unit 11 determines whether or not a coordinate detected by the touch event "DOWN" is in a display area of an own vehicle icon (S21). In a case where the coordinate detected by the touch event is outside the display area of the own vehicle icon (N in S21), it is determined that the gesture operation is not a traffic lane change instruction, and the process ends.

In a case where the coordinate detected by the touch event is in the display area of the own vehicle icon (Y in S21), determination unit 11 receives a touch event "MOVE" from the touch panel (S22). The touch event "MOVE" is an event representing a change from a contact state on a certain point of the touch panel to a contact state on another point of the touch panel by a finger or a pen. Then, determination unit 11 receives a touch event "UP" from the touch panel (S23). The touch event "UP" is an event representing a contact state change on the touch panel from a contact state to a non-contact state by a finger or a pen.

Determination unit 11 determines whether or not a coordinate detected by the touch event "UP" is in another lane in the same direction as the travelling direction of the own vehicle (S24). In a case where the coordinate detected by the touch event "UP" is in another lane in the same direction as the travelling direction of the own vehicle (Y in S24), instruction unit 13 issues a traffic lane change instruction command to automatic driving controller 20 (S25). In a case where the coordinate detected by the touch event "UP" is not in another lane in the same direction as the travelling direction of the own vehicle (N in S24), it is determined that the gesture operation is not a traffic lane change instruction, and the process ends.

Figure 7:
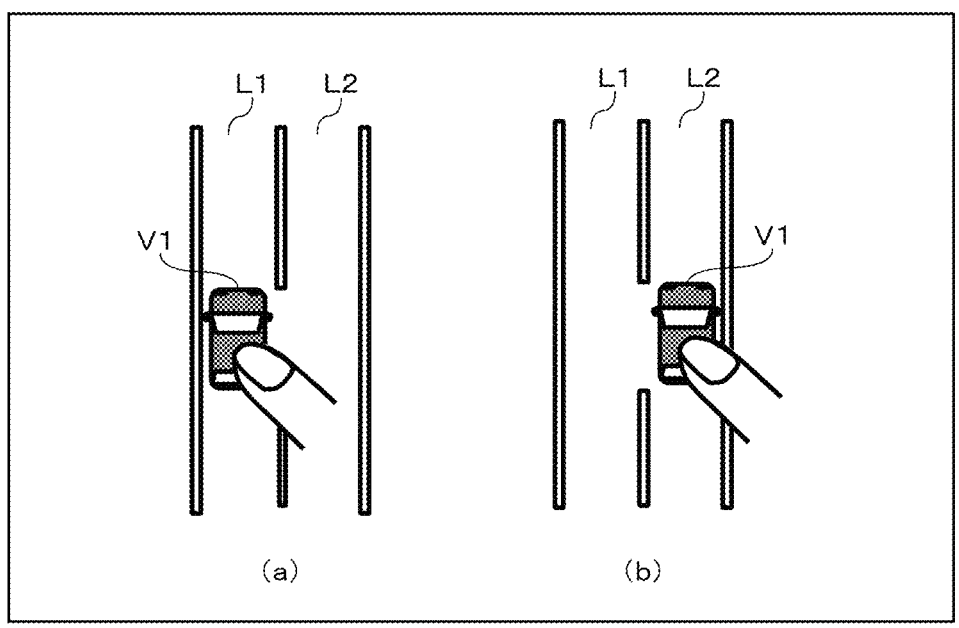
FIG. 7 is a diagram illustrating an example of a gesture operation according to the flowchart of FIG. 6.

FIG. 7 is a diagram illustrating an example of a gesture operation according to the flowchart of FIG. 6. In the schematic diagram illustrated in (a) of FIG. 7, a first lane L1 and a second lane L2 are displayed, and an own vehicle icon V1 is displayed on the first lane L1. As display forms of the own vehicle and the peripheral situation including a road, various display forms are considered. A real photographed image may be used, and a fine computer graphics (CG) image or an animation image may be used. Display of the own vehicle is not limited to an icon, and the own vehicle may be displayed as a simpler mark or character, or may be displayed as a real photographed image. In other words, there is no problem as long as the own vehicle is displayed on a screen as an object in any display form.

In a case where a driver wants to change the traffic lane of the own vehicle from the first lane L1 to the second lane L2, as illustrated in (a) of FIG. 7, a driver drags the own vehicle icon V1 on the first lane L1, and as illustrated in (b) of FIG. 7, drops the own vehicle icon V1 onto the second lane L2. Accordingly, a traffic lane change instruction command is issued.

Figure 8:
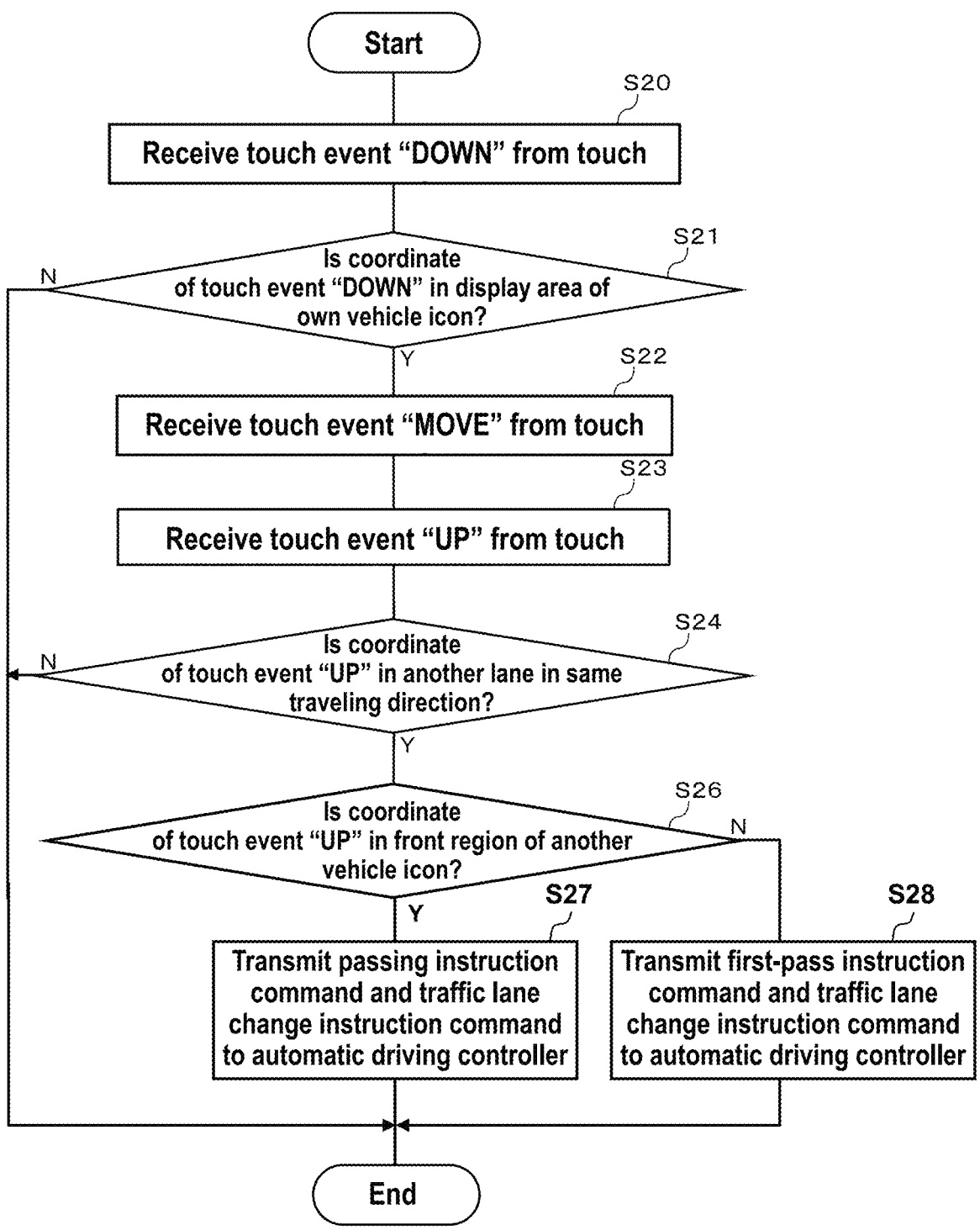
FIG. 8 is a flowchart illustrating a second processing example of issuing a traffic lane change instruction command by a gesture operation.

FIG. 8 is a flowchart illustrating a second processing example of issuing a traffic lane change instruction command by a gesture operation. The second processing example is an example in a case where there is another vehicle on a lane which is a destination of the traffic lane change. Processes from step S20 to step S24 are the same as those of the flowchart of FIG. 6.

In a case where the coordinate detected by the touch event "UP" is in another lane in the same direction as the travelling direction of the own vehicle (Y in S24), determination unit 11 determines whether or not the coordinate is in a region in front of an another vehicle icon (S26). In a case where the coordinate is in the region in front of an another vehicle icon (Y in S26), instruction unit 13 issues an another vehicle passing instruction command and a traffic lane change instruction command to automatic driving controller 20 (S27). In a case where the coordinate is in a region behind an another vehicle icon (N in S26), instruction unit 13 issues an another vehicle first-pass instruction command and a traffic lane change instruction command to automatic driving controller 20 (S28). In other words, after another vehicle precedes the own vehicle, the traffic lane of the own vehicle is changed such that the own vehicle enters into the lane behind the another vehicle.

Figure 9:
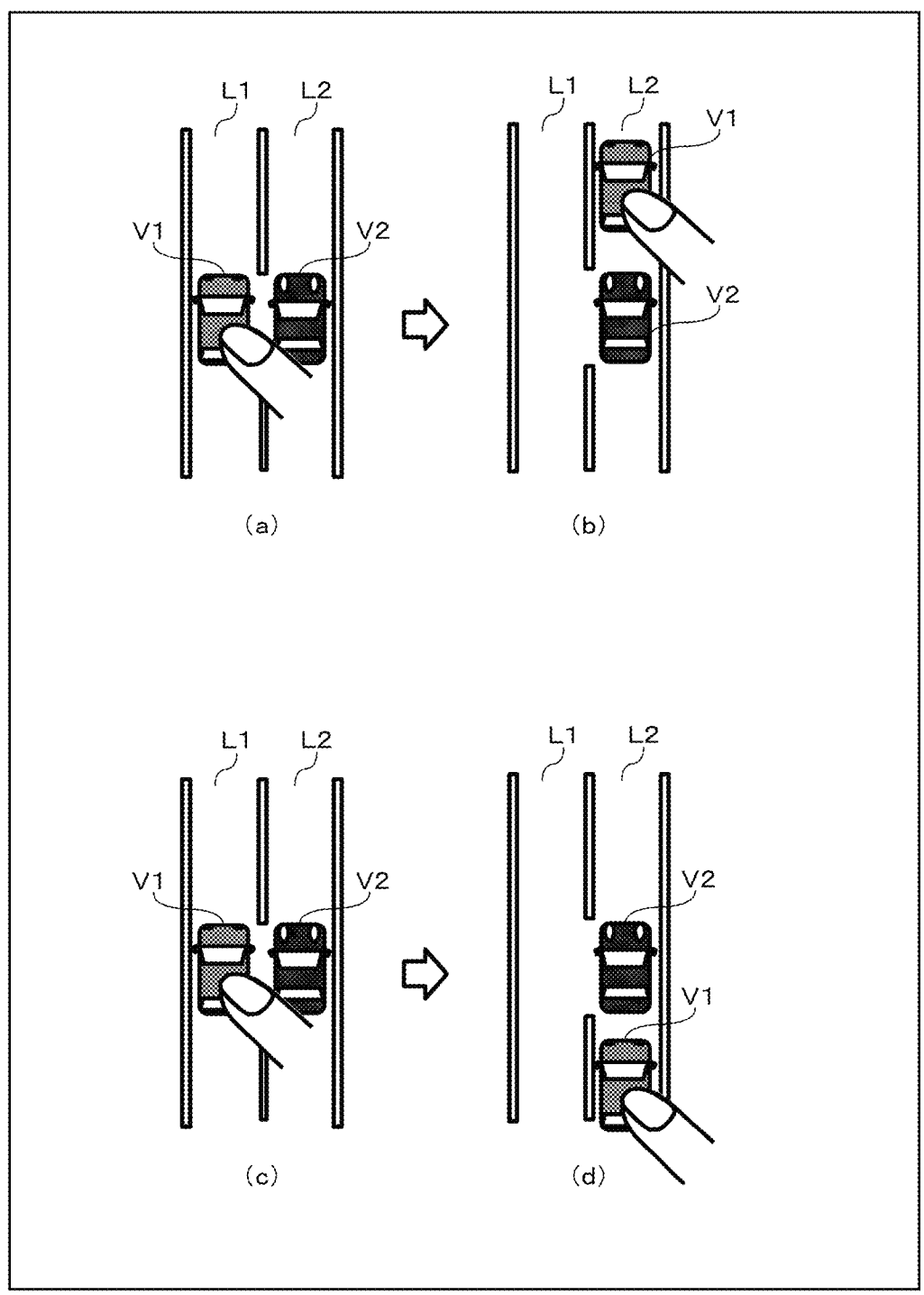
FIG. 9 is a diagram illustrating an example of a gesture operation according to the flowchart of FIG. 8.

FIG. 9 is a diagram illustrating an example of a gesture operation according to the flowchart of FIG. 8. In a case where a driver wants to change the traffic lane of the own vehicle from the first lane L1 to the second lane L2 in front of another vehicle, as illustrated in (a) of FIG. 9, a driver drags the own vehicle icon V1 on the first lane L1, and as illustrated in (b) of FIG. 9, drops the own vehicle icon V1 onto the second lane L2 in front of the another vehicle icon V2. Accordingly, a passing instruction command and a traffic lane change instruction command are issued. In a case where a driver wants to change the traffic lane of the own vehicle from the first lane L1 to the second lane L2 behind another vehicle, as illustrated in (c) of FIG. 9, a driver drags the own vehicle icon V1 on the first lane L1, and as illustrated in (d) of FIG. 9, drops the own vehicle icon V1 onto the second lane L2 behind the another vehicle icon V2. Accordingly, a first-pass instruction command and a traffic lane change instruction command are issued.

Figure 10:
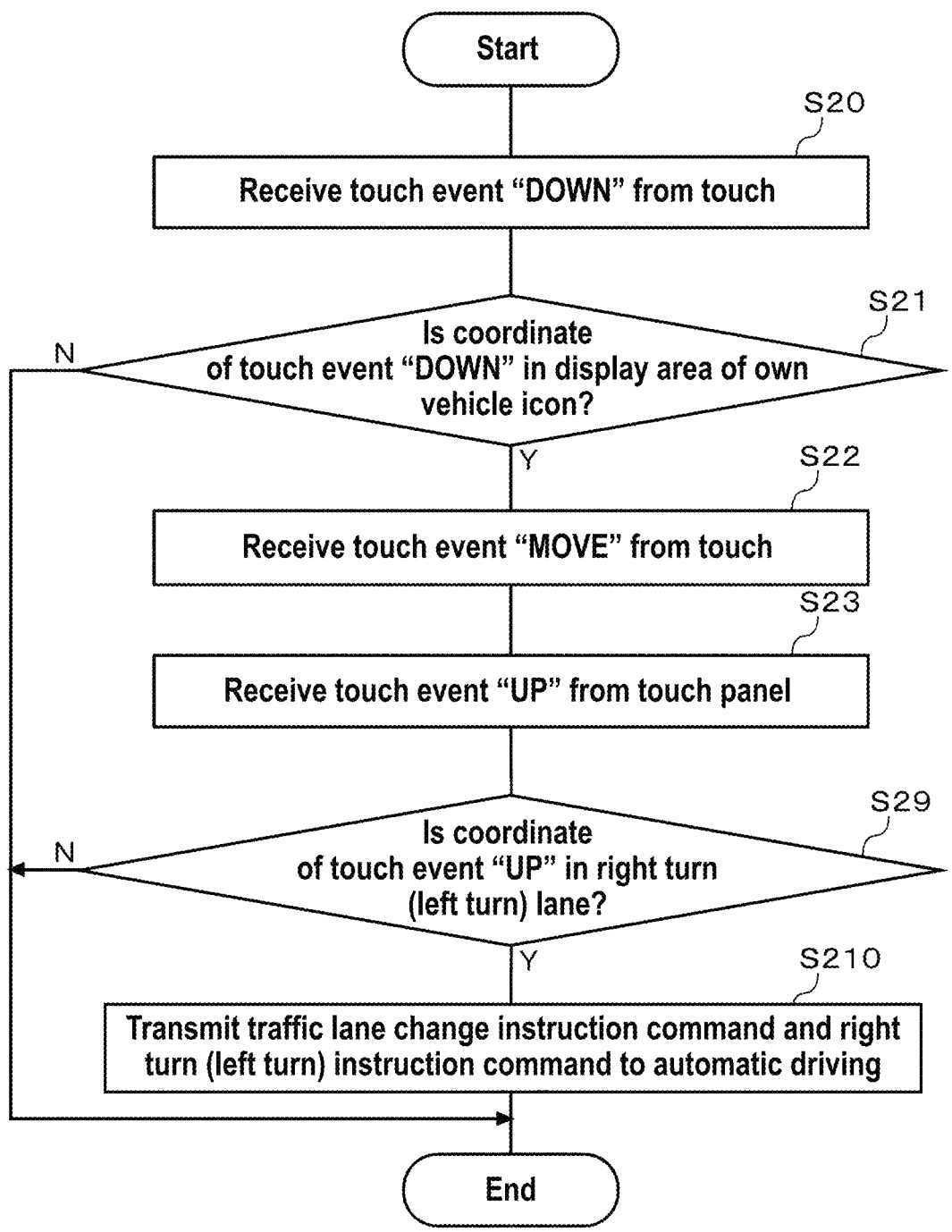
FIG. 10 is a flowchart illustrating a third processing example of issuing a traffic lane change instruction command by a gesture operation.

FIG. 10 is a flowchart illustrating a third processing example of issuing a traffic lane change instruction command by a gesture operation. The third processing example is an example in a case where there is a right-turn-only lane or a left-turn-only lane. Processes from step S20 to step S23 are the same as those of the flowchart of FIG. 6.

Determination unit 11 determines whether or not the coordinate detected by the touch event "UP" is in a right-turn-only lane or a left-turn-only lane (S29). In a case where the coordinate is in a right-turn-only lane or a left-turn-only lane (Y in S29), instruction unit 13 issues a traffic lane change instruction command and a right turn instruction command or a left-turn instruction command to automatic driving controller 20 (S210). In a case where the coordinate is not in a right-turn-only lane or a left-turn-only lane (N in S29), the processing of step S210 is not invoked.

Figure 11:
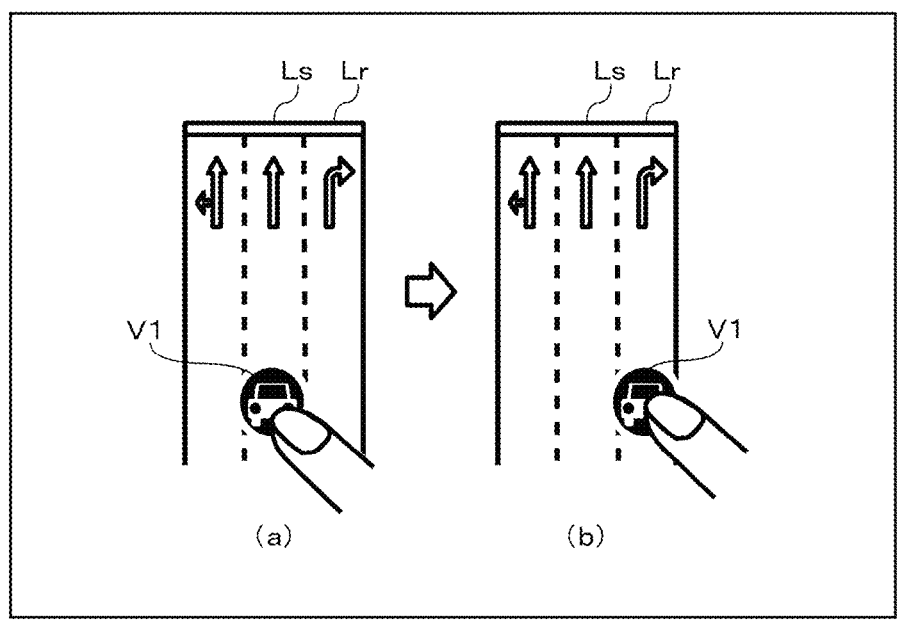
FIG. 11 is a diagram illustrating an example of a gesture operation according to the flowchart of FIG. 10.

FIG. 11 is a diagram illustrating an example of a gesture operation according to the flowchart of FIG. 10. In a case where a driver wants to change the traffic lane of the own vehicle from a straight-only lane Ls to a right-turn-only lane Lr, as illustrated in (a) of FIG. 11, a driver drags the own vehicle icon V1 on the straight-only lane Ls, and as illustrated in (b) of FIG. 11, drops the own vehicle icon V1 onto the right-turn-only lane Lr. Accordingly, a traffic lane change instruction command and a right turn instruction command are issued.

Figure 12:
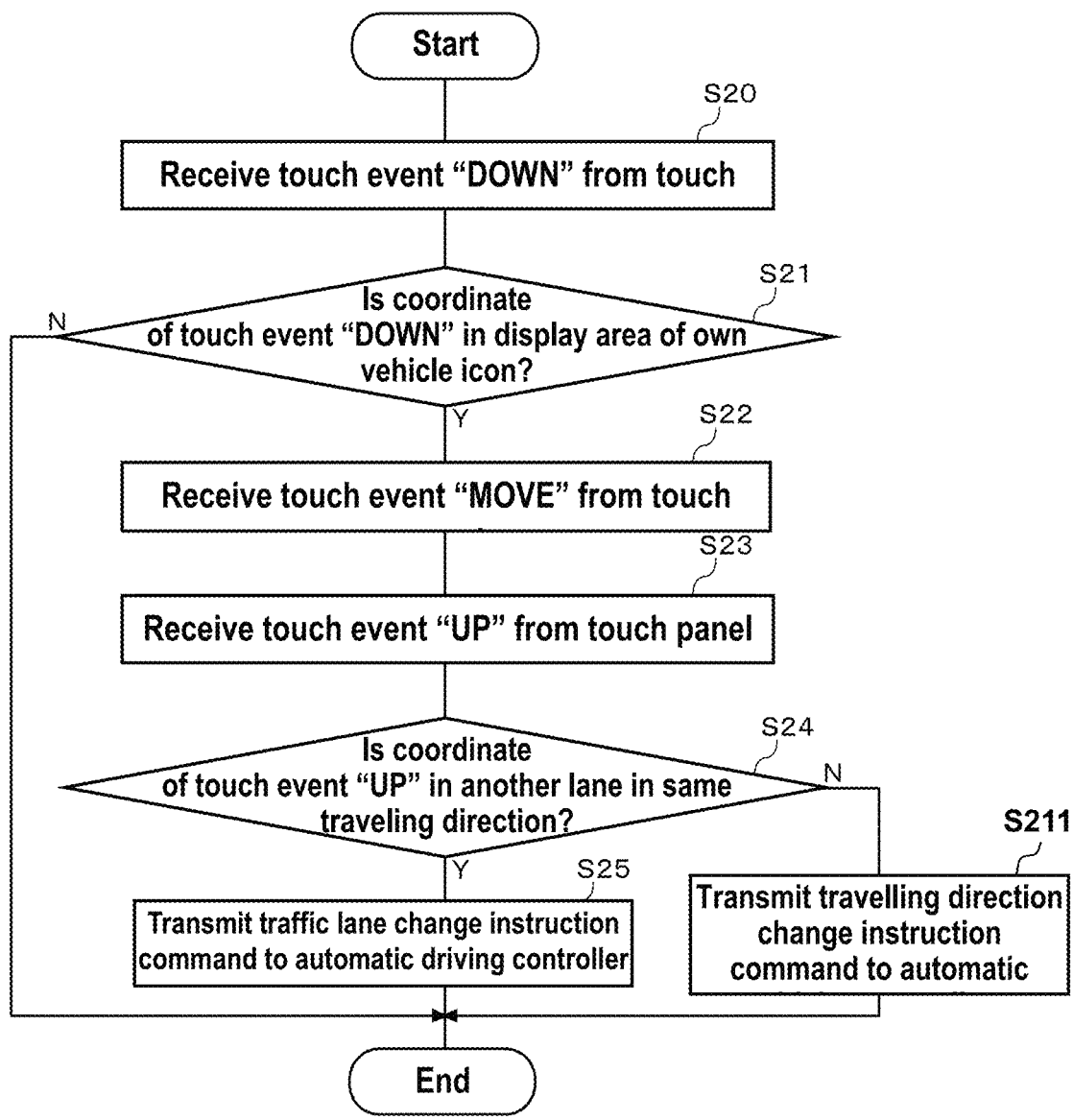
FIG. 12 is a flowchart illustrating a fourth processing example of issuing a traffic lane change instruction command by a gesture operation.

FIG. 12 is a flowchart illustrating a fourth processing example of issuing a traffic lane change instruction command by a gesture operation. The fourth processing example is an example in a case where the content of a command is changed according to a context. Processes from step S20 to step S24 are the same as those of the flowchart of FIG. 6.

In a case where the coordinate detected by the touch event "UP" is in another lane in the same direction as the travelling direction of the own vehicle (Y in S24), instruction unit 13 issues a traffic lane change instruction command to automatic driving controller 20 (S15). In a case where the coordinate is not in another lane in the same direction as the travelling direction of the own vehicle (N in S24), instruction unit 13 issues a travelling direction change instruction command (for example, a right turn instruction command, a left turn instruction command, a U-turn instruction command) to automatic driving controller 20 (S211). In this way, multiple control commands can be issued by the same touch operation in combination with information on multiple lanes. A control command according to the own vehicle peripheral situation is issued by only performing the same gesture by a driver, and thus it is possible to perform an appropriate driving instruction by a simpler operation.

Figure 13:
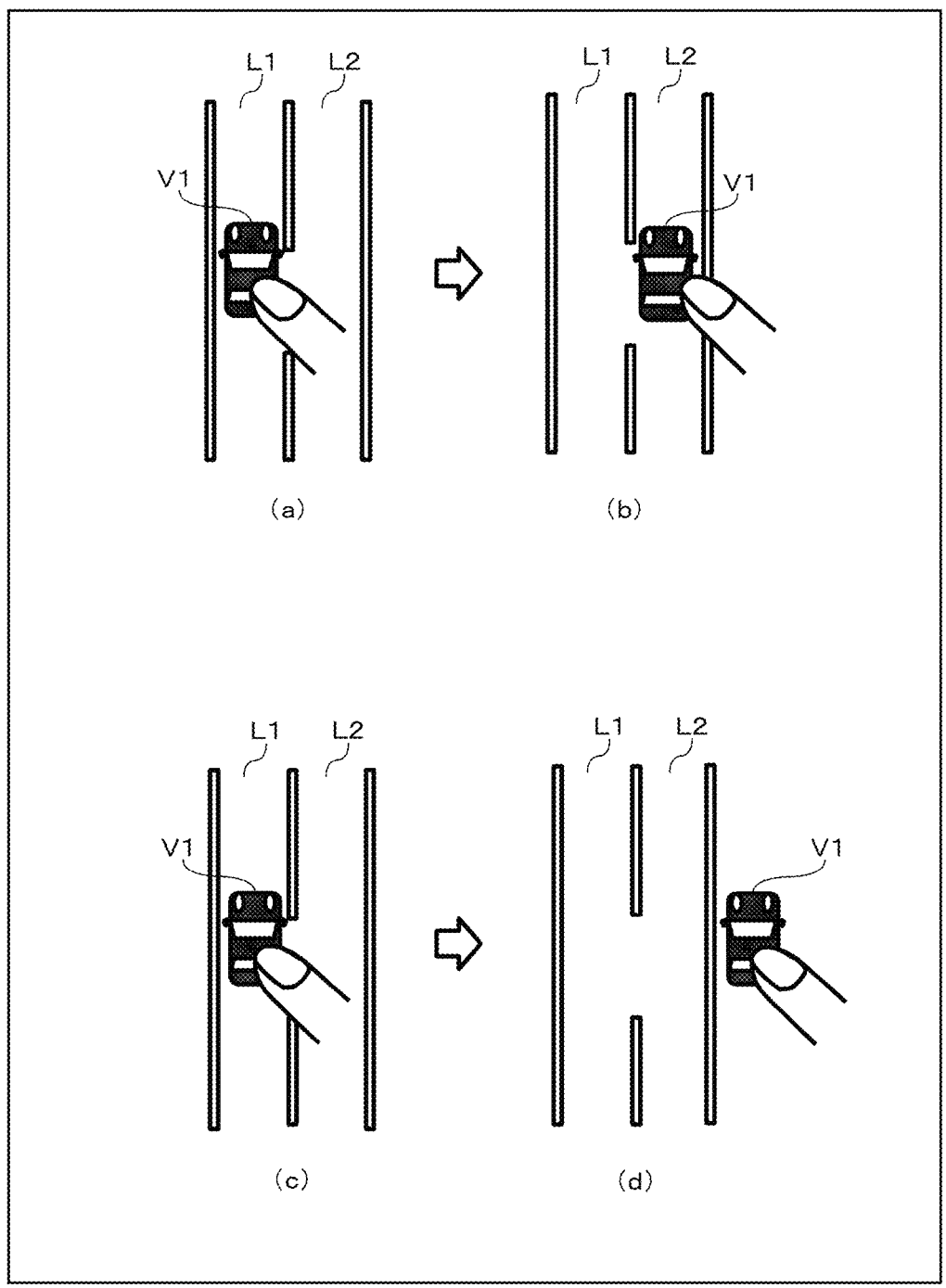
FIG. 13 is a diagram illustrating an example of a gesture operation according to the flowchart of FIG. 12.

FIG. 13 is a diagram illustrating an example of a gesture operation according to the flowchart of FIG. 12. In a case where a driver wants to change the traffic lane of the own vehicle from the first lane L1 to the second lane L2, as illustrated in (a) of FIG. 13, a driver drags the own vehicle icon V1 on the first lane L1, and as illustrated in (b) of FIG. 13, drops the own vehicle icon V1 onto the second lane L2. Accordingly, a traffic lane change instruction command is issued. On the other hand, in a case where a driver wants the own vehicle to turn right, as illustrated in (c) of FIG. 13, a driver drags the own vehicle icon V1 on the first lane L1, and as illustrated in (d) of FIG. 13, drops the own vehicle icon V1 onto the right outside of all lanes. Accordingly, a right turn instruction command is issued.

Figure 14:
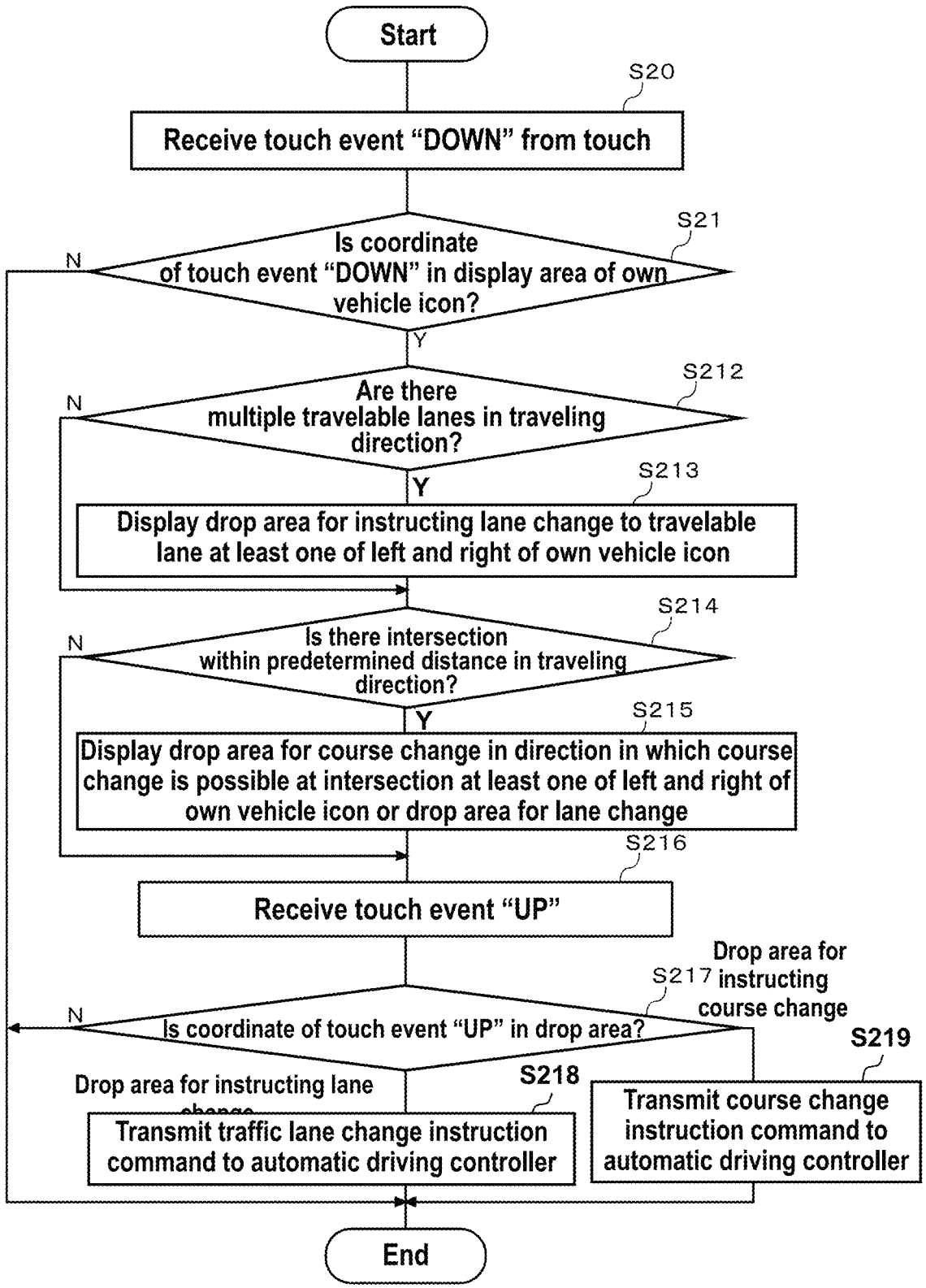
FIG. 14 is a flowchart illustrating a fifth processing example of issuing a traffic lane change instruction command by a gesture operation.

FIG. 14 is a flowchart illustrating a fifth processing example of issuing a traffic lane change instruction command by a gesture operation. The fifth processing example is an example in which a flick input is used. Determination unit 11 of HMI controller 10 receives a touch event "DOWN" from the touch panel (S20). Determination unit 11 determines whether or not a coordinate detected by the touch event "DOWN" is in a display area of an own vehicle icon (S21). In a case where the coordinate detected by the touch event "DOWN" is outside the display area of the own vehicle icon (N in S21), it is determined that the gesture operation is not a traffic lane change instruction, and the process ends.

In a case where the coordinate detected by the touch event "DOWN" is in the display area of the own vehicle icon (Y in S21), determination unit 11 determines whether or not there are multiple travelable lanes in the traveling direction of the own vehicle (S212). In a case where there are multiple travelable lanes (Y in S212), generation unit 12 generates a drop area for instructing lane change to the travelable lane at least one of the left and the right of the own vehicle icon, and displays the drop area on the touch panel (S213). In a case where there are not multiple travelable lanes (N in S212), the process of S213 is skipped.

Determination unit 11 determines whether or not there is an intersection within a predetermined distance in the traveling direction (S214). In a case where there is an intersection within a predetermined distance in the traveling direction (Y in S214), generation unit 12 generates a drop area for instructing course change in a direction in which course change is possible at an intersection at least one of the left and the right of the own vehicle icon or the drop area for instructing lane change, and displays the drop area for instructing course change on the touch panel (S215). In a case where there is no intersection within a predetermined distance in the traveling direction (N in S214), the process of S215 is skipped.

Determination unit 11 receives a touch event "UP" from the touch panel (S216). Determination unit 11 determines whether or not a coordinate detected by the touch event "UP" is in the drop area (S217). In a case where the coordinate detected by the touch event "UP" is not in the drop area (N in S217), it is determined that the gesture operation is not a traffic lane change instruction, and the process ends. In a case where the coordinate detected by the touch event "UP" is in the drop area for instructing a traffic lane change (drop area for instructing a traffic lane change in S217), instruction unit 13 issues a traffic lane change instruction command to automatic driving controller 20 (S218). In a case where the coordinate detected by the touch event "UP" is in the drop area for instructing course change (drop area for instructing course change in S217), instruction unit 13 issues a course change instruction command to automatic driving controller 20 (S219).

Figure 15:
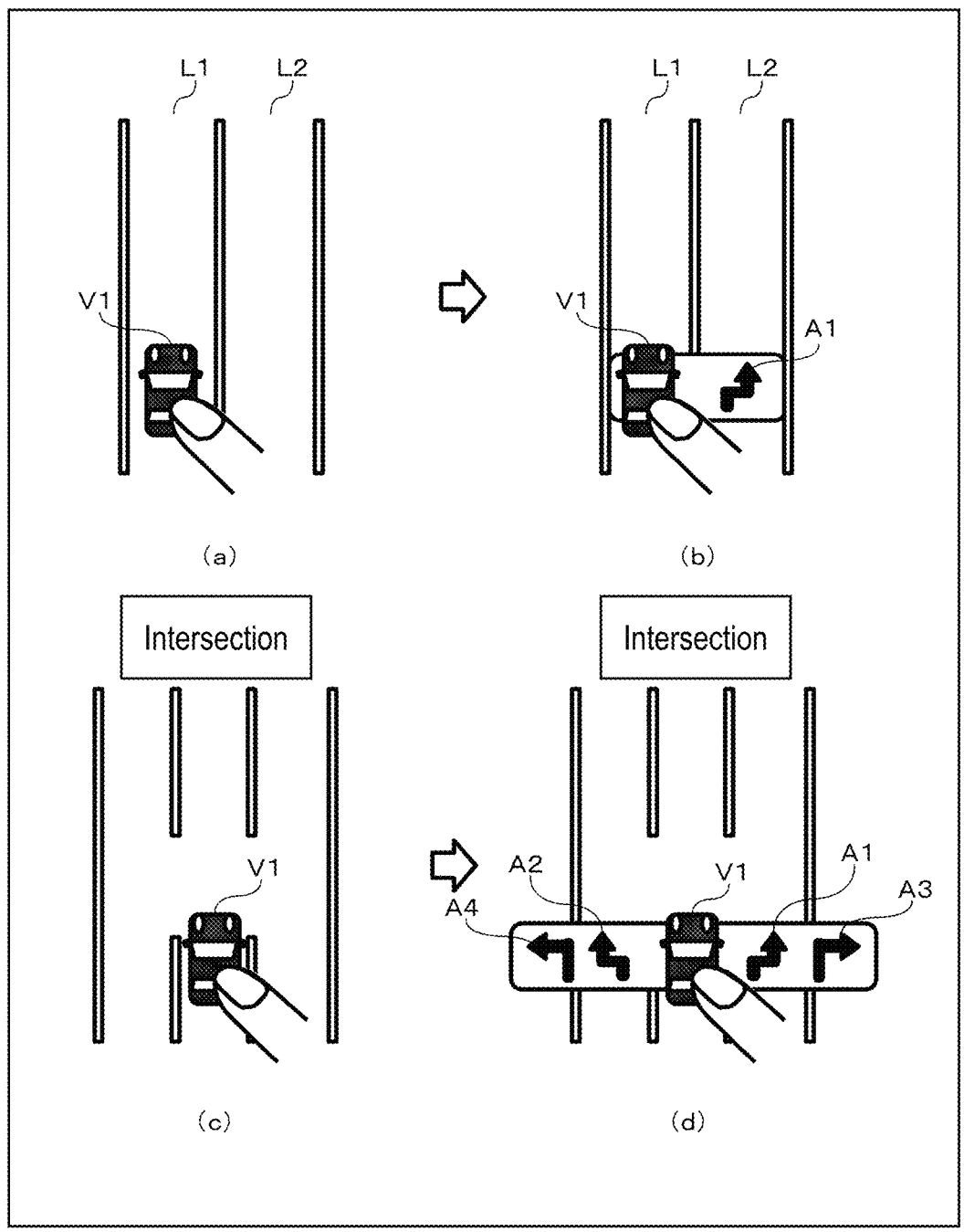
FIG. 15 is a diagram illustrating an example of a gesture operation according to the flowchart of FIG. 14.

FIG. 15 is a diagram illustrating an example of a gesture operation according to the flowchart of FIG. 14. In a case where a driver wants to change the traffic lane of the own vehicle from the first lane L1 to the second lane L2, as illustrated in (a) of FIG. 15, a driver touches the own vehicle icon V1 on the first lane L1. When the own vehicle icon V1 is touched, as illustrated in (b) of FIG. 15, the drop area A1 for instructing a traffic lane change to the second lane L2 is displayed. When a user flicks the own vehicle icon V1 onto the drop area A1, a traffic lane change instruction command for instructing a traffic lane change to the second lane L2 is issued.

In (c) of FIG. 15, a case where it is assumed that there is an intersection ahead is represented. In this case, when a user touches the own vehicle icon V1, as illustrated in (d) of FIG. 15, a drop area A1 for instructing a traffic lane change to a right lane, a drop area A2 for instructing a traffic lane change to a left lane, a drop area A3 for instructing right turn, and a drop area A4 for instructing left turn are displayed. A user flicks the own vehicle icon V1 onto any one of the drop areas, and thus the corresponding command is issued. Accordingly, further, a desired control command can be issued by only moving the user's finger by a small moving distance.

Figure 16:
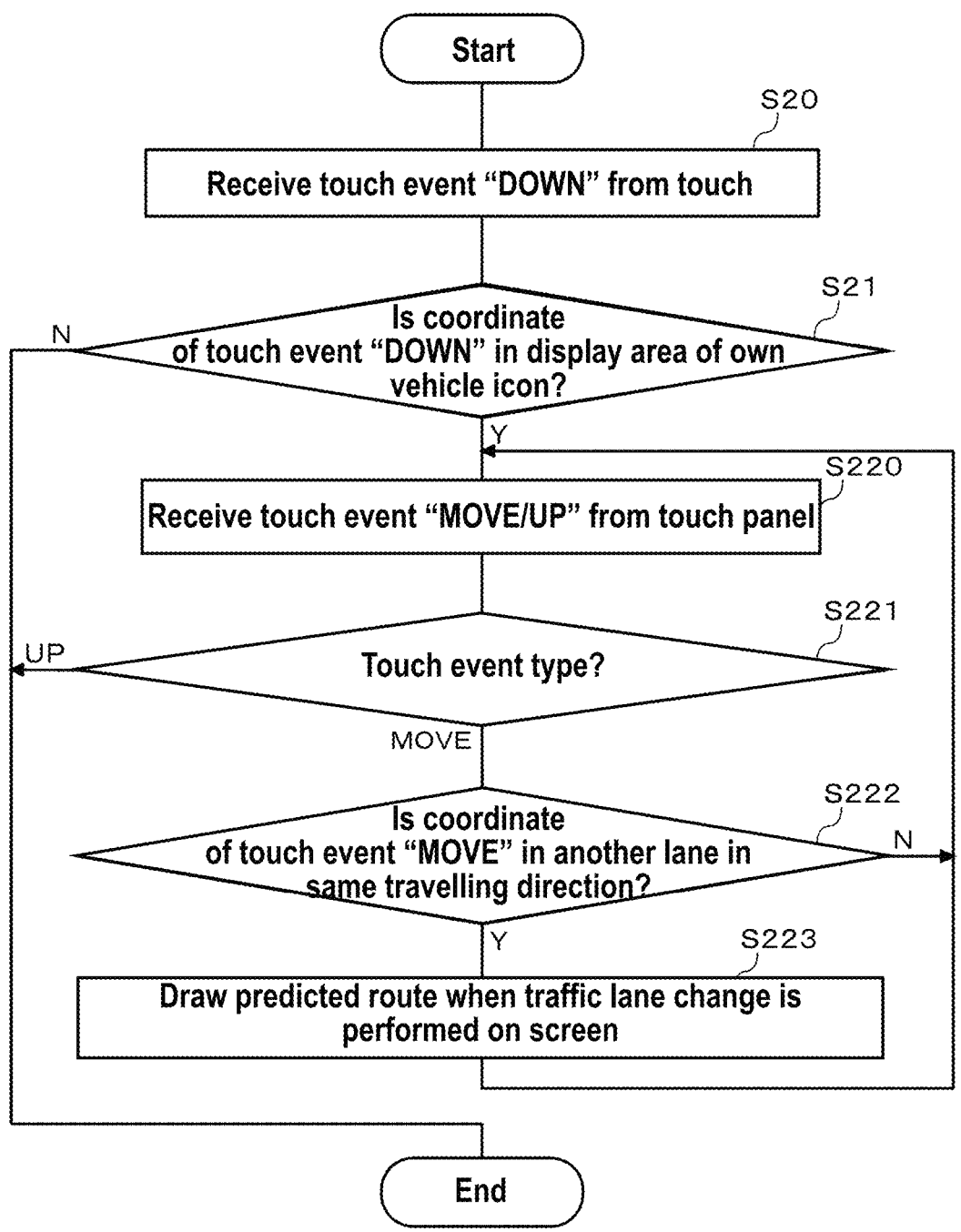
FIG. 16 is a flowchart illustrating a sixth processing example of issuing a traffic lane change instruction command by a gesture operation.

FIG. 16 is a flowchart illustrating a sixth processing example of issuing a traffic lane change instruction command by a gesture operation. The sixth processing example is an example of displaying a trajectory of the own vehicle icon in the schematic diagram. Determination unit 11 of HMI controller 10 receives a touch event "DOWN" from the touch panel (S20). Determination unit 11 determines whether or not a coordinate detected by the touch event "DOWN" is in a display area of the own vehicle icon (S21). In a case where the coordinate is in the outside of the display area of the own vehicle icon (N in S21), it is determined that the gesture operation is not a traffic lane change instruction, and the process ends.

In a case where the coordinate is in the inside of the display area of the own vehicle icon (Y in S21), determination unit 11 receives a touch event "MOVE"/"UP" from the touch panel (S220). Determination unit 11 determines the type of the touch event (S221). In a case where the type of the touch event is "MOVE" ("MOVE" in S221), determination unit 11 determines whether or not a coordinate detected by the touch event "MOVE" is in another lane in the same direction as the travelling direction of the own vehicle (S222). In a case where the coordinate is in another lane in the same direction as the travelling direction of the own vehicle (Y in S222), generation unit 12 generates a predicted route of the own vehicle when the traffic lane change is performed, and displays the predicted route of the own vehicle on the touch panel (S223). In a case where the coordinate is not in another lane in the same direction as the travelling direction of the own vehicle (N in S222), the process of S223 is skipped. Next, the process transitions to step S220. Since the present flowchart is focused on the display of the predicted route, in step S221, subsequent processing in a case where the type of the touch event is "UP" (UP in S221) is omitted.

Figure 17:
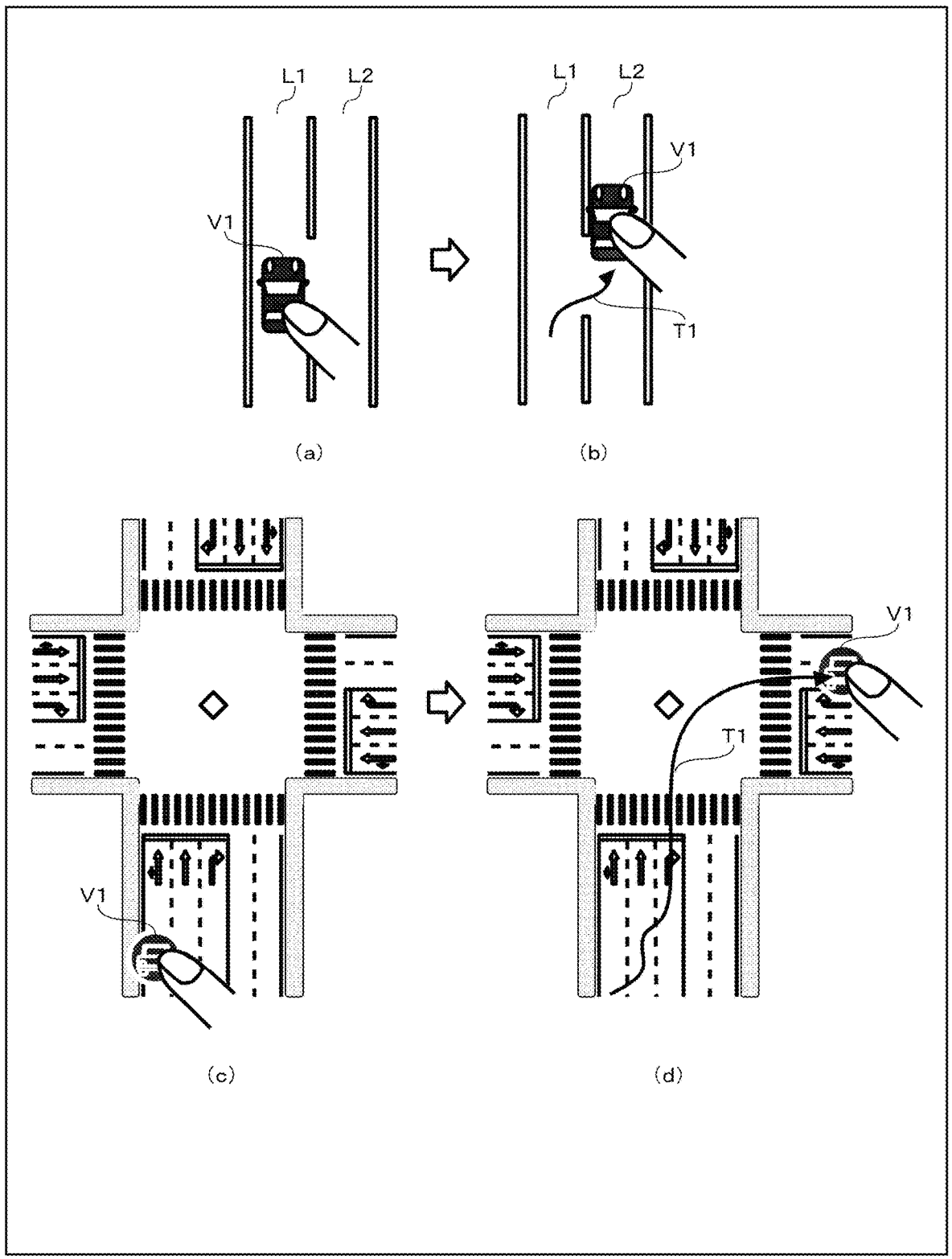
FIG. 17 is a diagram illustrating an example of a gesture operation according to the flowchart of FIG. 16.

FIG. 17 is a diagram illustrating an example of a gesture operation according to the flowchart of FIG. 16. In a case where a driver wants to change the traffic lane of the own vehicle from the first lane L1 to the second lane L2, as illustrated in (a) of FIG. 17, a driver drags the own vehicle icon V1 on the first lane L1. As illustrated in (b) of FIG. 17, a trajectory T1 through which the own vehicle passes in a case where the own vehicle icon V1 being moved is dropped onto the current position, is displayed. In a case where a driver wants the own vehicle to turn right at an intersection, as illustrated in (c) of FIG. 17, a driver drags the own vehicle icon V1. As illustrated in (d) of FIG. 17, a trajectory T1 through which the own vehicle passes in a case where the own vehicle icon V1 being moved is dropped onto the current position, is displayed. The detailed description of the display of the trajectory will be described later.

Figure 18:
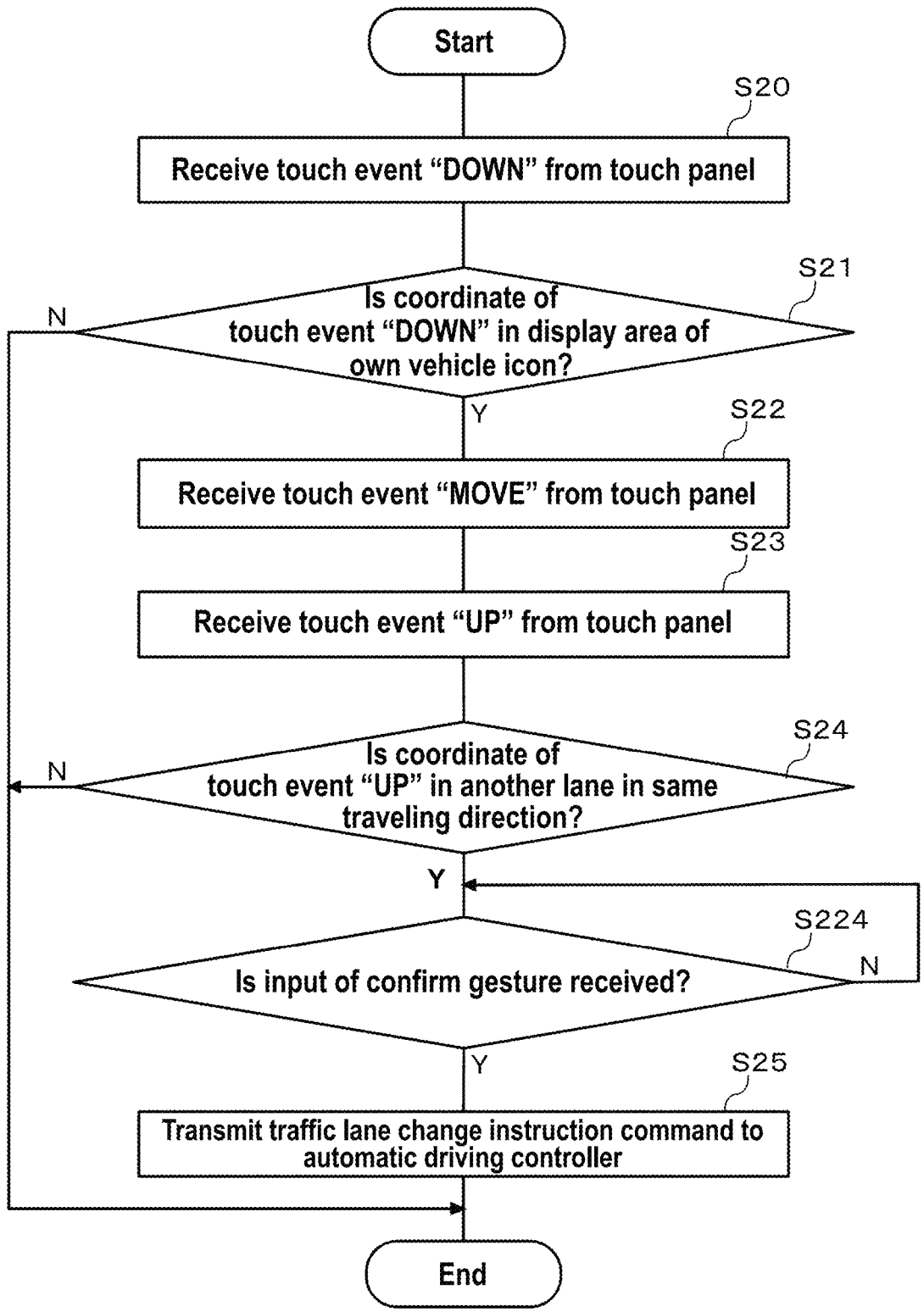
FIG. 18 is a flowchart illustrating a seventh processing example of issuing a traffic lane change instruction command by a gesture operation.

FIG. 18 is a flowchart illustrating a seventh processing example of issuing a traffic lane change instruction command by a gesture operation. The seventh processing example is an example of requesting a confirm operation. Processes from step S20 to step S24 are the same as those of the flowchart of FIG. 6.

In a case where the coordinate detected by the touch event "UP" is in another lane in the same direction as the travelling direction of the own vehicle (Y in S24), when determination unit 11 receives an input of a confirm gesture (Y in S224), instruction unit 13 issues a traffic lane change instruction command to automatic driving controller 20 (S25). During a period for which a confirm gesture is not input (N in S224), the issue of the command is suspended.

Figure 19:
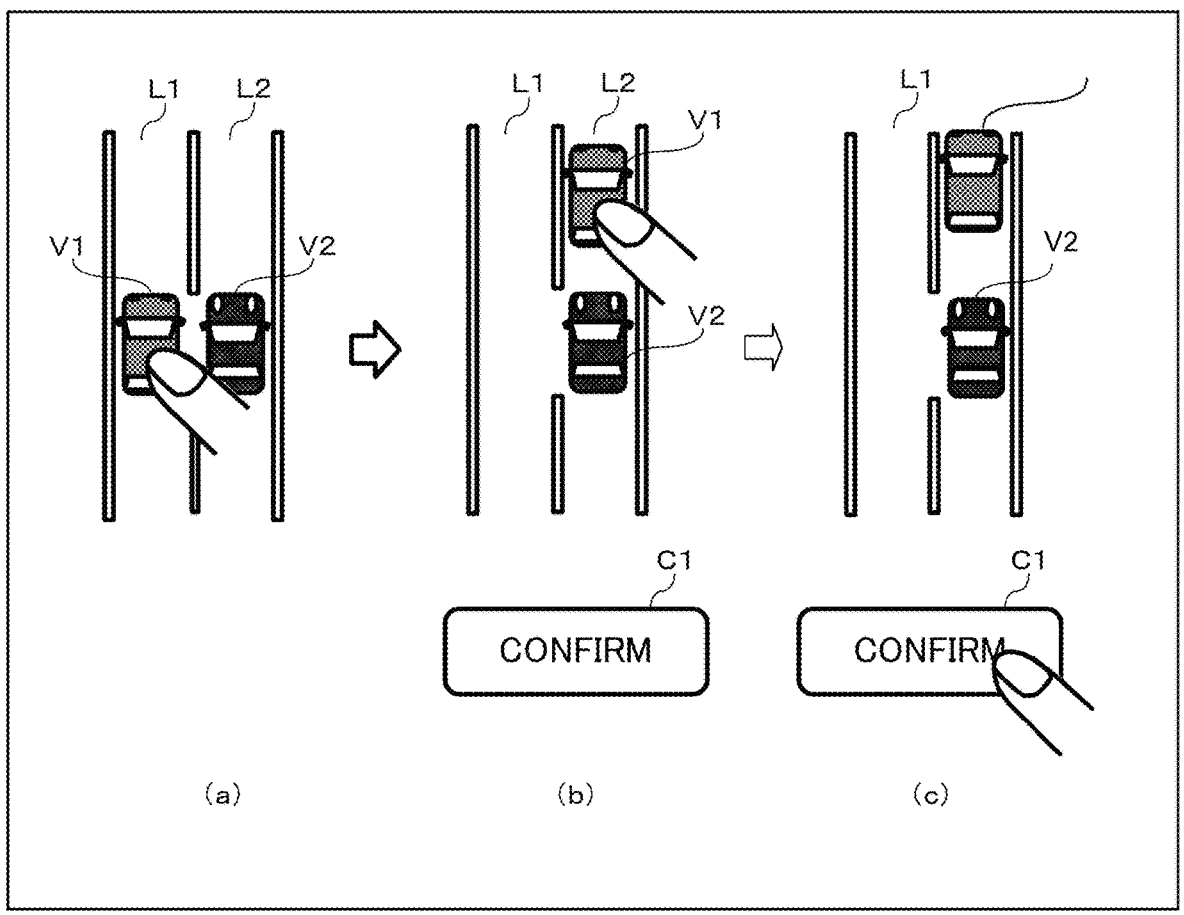
FIG. 19 is a diagram illustrating an example of a gesture operation according to the flowchart of FIG. 18.

FIG. 19 is a diagram illustrating an example of a gesture operation according to the flowchart of FIG. 18. In a case where a driver wants to change the traffic lane of the own vehicle from the first lane L1 to the second lane L2 in front of another vehicle (another vehicle icon V2), as illustrated in (a) of FIG. 19, a driver drags the own vehicle icon V1 on the first lane L1, and as illustrated in (b) of FIG. 19, moves the own vehicle icon V1 onto the second lane L2. When the own vehicle icon V1 has been moved, a confirm button C1 is displayed. As illustrated in (c) of FIG. 19, after the own vehicle icon V1 is dropped onto the second lane L2, when the confirm button C1 is pressed, a traffic lane change instruction command for instructing the traffic lane change to the second lane L2 is issued. Accordingly, further, it is possible to prevent erroneous operations.

Figure 20:
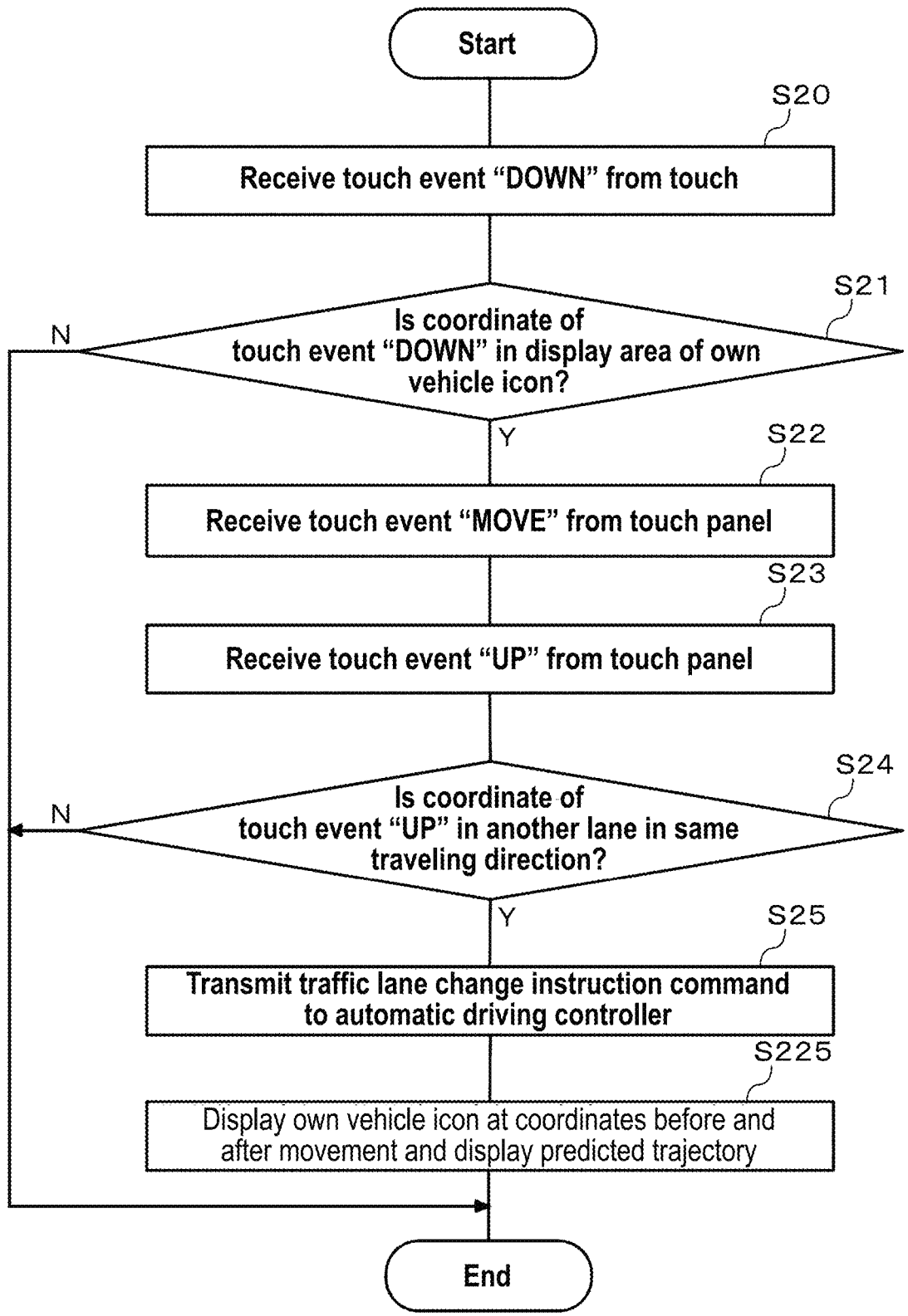
FIG. 20 is a flowchart illustrating an eighth processing example of issuing a traffic lane change instruction command by a gesture operation.

FIG. 20 is a flowchart illustrating an eighth processing example of issuing a traffic lane change instruction command by a gesture operation. The eighth processing example is an example in a case where display is added during control. During control indicates during a period for which a traffic lane change instruction command is issued and then the traffic lane change of the own vehicle is completed. Processes from step S20 to step S25 are the same as those of the flowchart of FIG. 6.

After instruction unit 13 issues a traffic lane change instruction command to automatic driving controller 20 (S25), generation unit 12 generates the own vehicle icon at the coordinate before the movement of the own vehicle and the coordinate after the movement of the own vehicle, generates a predicted trajectory of the own vehicle, and displays the predicted trajectory of the own vehicle on the touch panel (S225).

Figure 21:
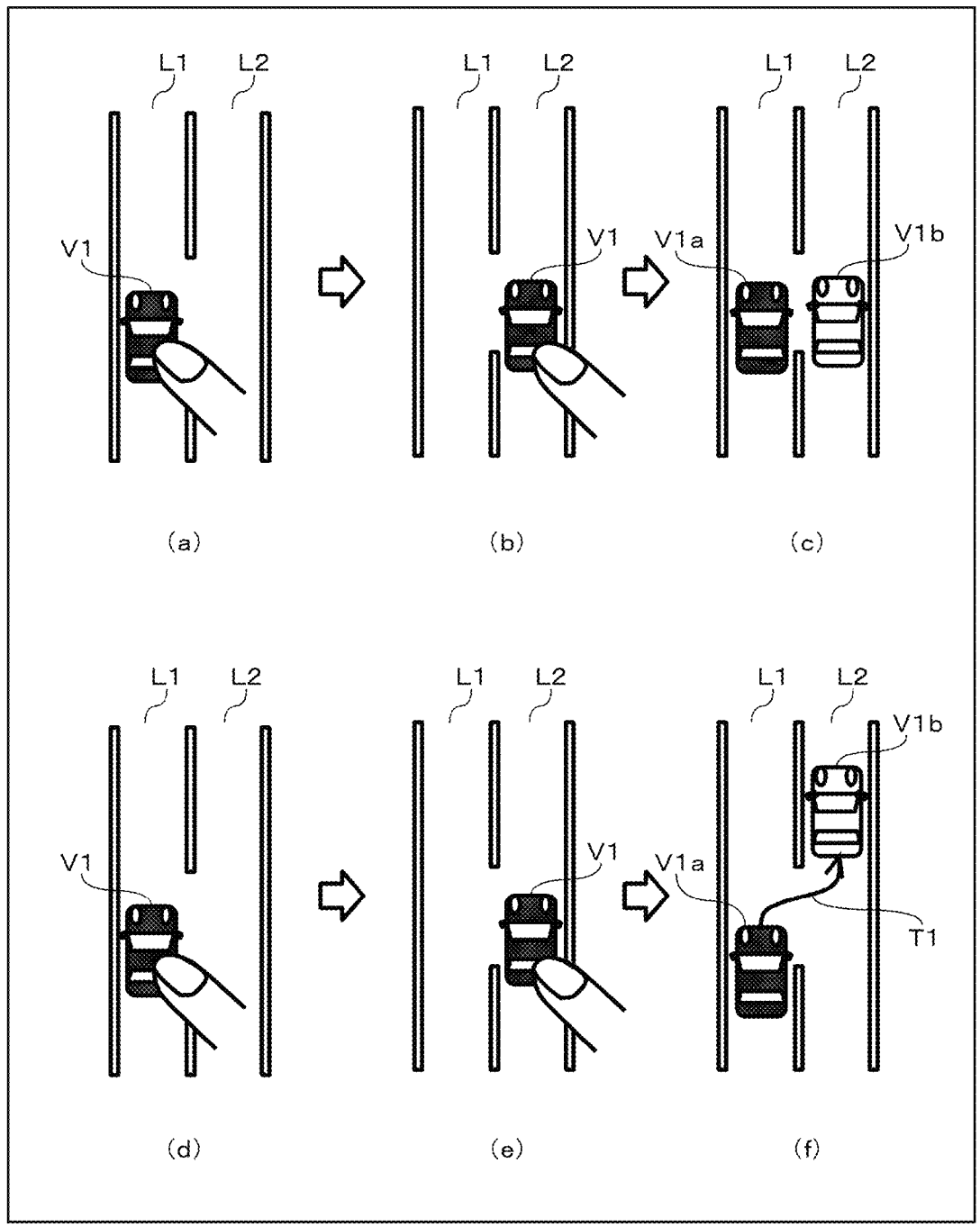
FIG. 21 is a diagram illustrating an example of a gesture operation according to the flowchart of FIG. 20.

FIG. 21 is a diagram illustrating an example of a gesture operation according to the flowchart of FIG. 20. In a case where a driver wants to change the traffic lane of the own vehicle from the first lane L1 to the second lane L2, as illustrated in (a) and (d) of FIG. 21, a driver drags the own vehicle icon V1 on the first lane L1, and as illustrated in (b) and (e) of FIG. 21, drops the own vehicle icon V1 onto the second lane L2. Accordingly, a traffic lane change instruction command is issued. During the execution of the traffic lane change instruction command, as illustrated in (c) and (f) of FIG. 21, the own vehicle icon V1a is displayed at the original position before starting of the traffic lane change, and the own vehicle icon V1b is displayed at the target position after the completion of the traffic lane change. As illustrated in (f) of FIG. 21, a predicted trajectory T1 of the own vehicle may be displayed.

Figure 22:
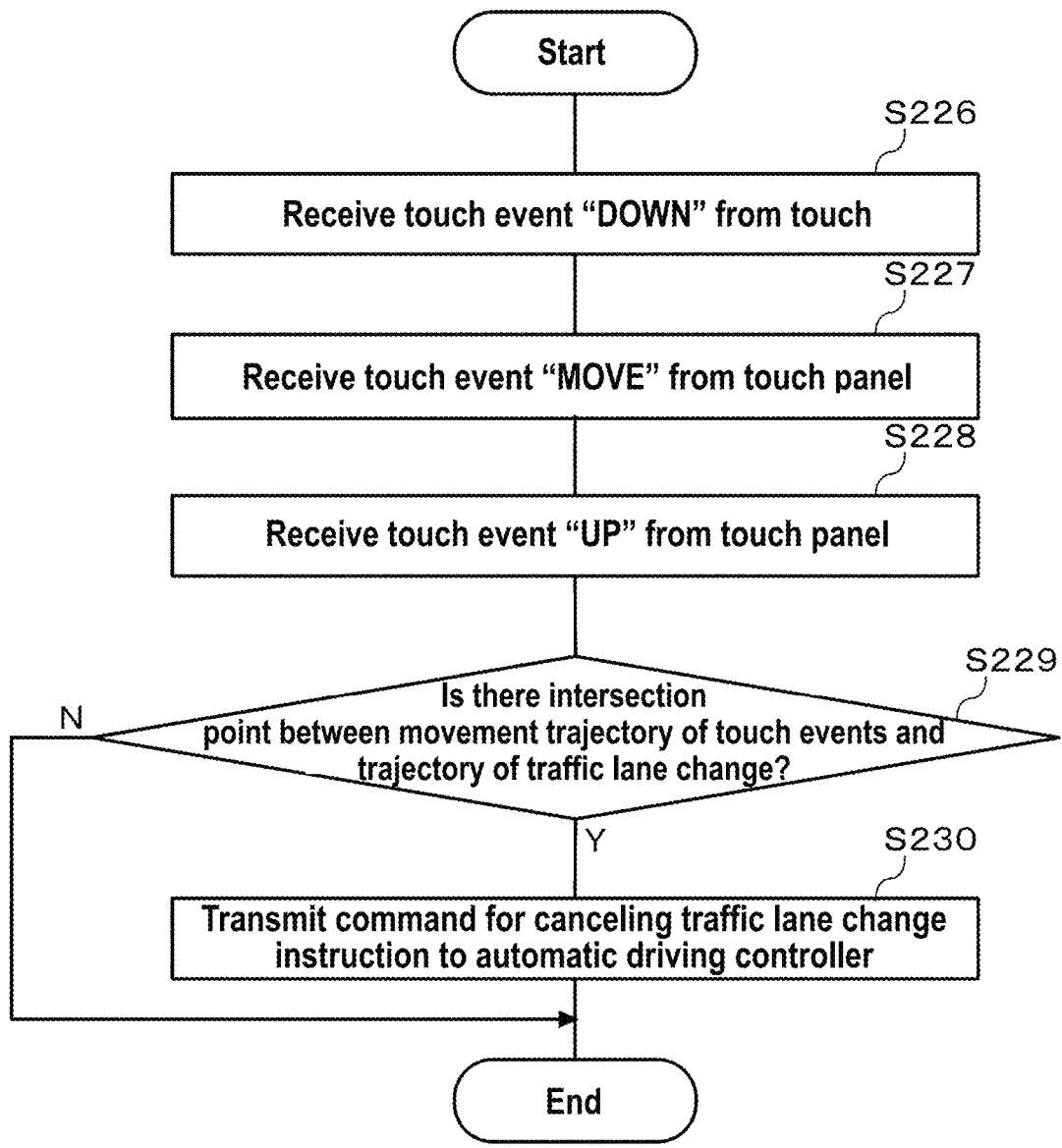
FIG. 22 is a flowchart illustrating a processing example of issuing a cancel command after a traffic lane change instruction command is issued by a gesture operation.

FIG. 22 is a flowchart illustrating a processing example of issuing a cancel command after a traffic lane change instruction command is issued by a gesture operation. After a traffic lane change instruction command is issued to automatic driving controller 20, determination unit 11 of HMI controller 10 receives a touch event (DOWN) from the touch panel (S226). Then, determination unit 11 of HMI controller 10 receives a touch event "MOVE" from the touch panel (S227). Then, determination unit 11 of HMI controller 10 receives a touch event "UP" from the touch panel (S228). Determination unit 11 determines whether or not there is an intersection point between the movement trajectory of the touch event and the trajectory of the traffic lane change (S229). In a case where there is an intersection point (Y in S229), instruction unit 13 issues a command for canceling the traffic lane change instruction command that is issued earlier to automatic driving controller 20 (S230). In a case where there is no intersection point (N in S229), a cancel command is not issued.

Figure 23:
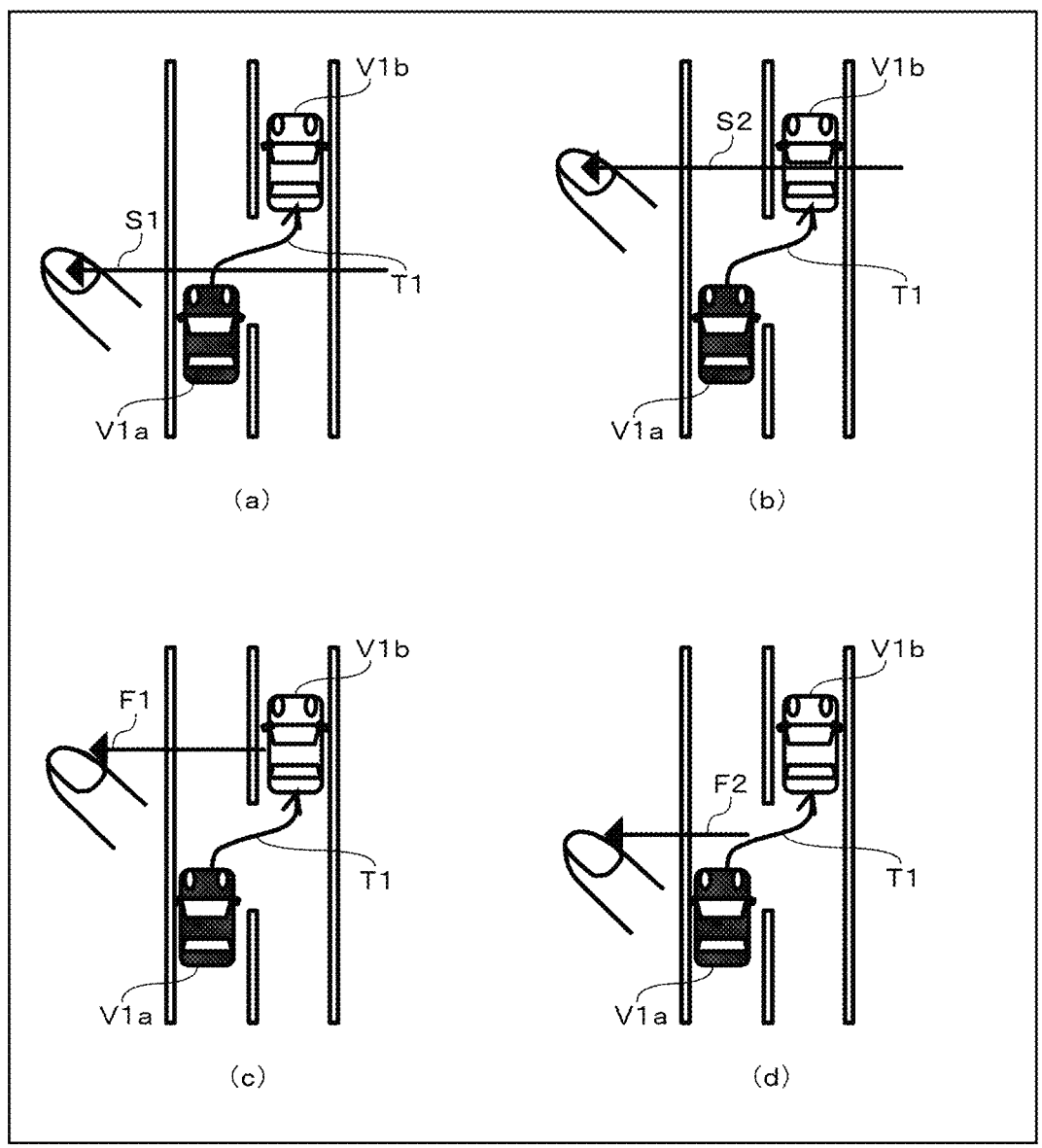
FIG. 23 is a diagram illustrating an example of a gesture operation according to the flowchart of FIG. 22.

FIG. 23 is a diagram illustrating an example of a gesture operation according to the flowchart of FIG. 22. In (a) of FIG. 23, an example in which, when a swipe S1 of the predicted trajectory T1 is performed so as to traverse the predicted trajectory T1, a cancel command for canceling the traffic lane change instruction command is issued, is illustrated. In (b) of FIG. 23, an example in which, when a swipe S2 of the own vehicle icon V1b after the movement is performed so as to traverse the own vehicle icon V1b, a cancel command for canceling the traffic lane change instruction command is issued, is illustrated. In (c) of FIG. 23, an example in which, when a flick F1 of the own vehicle icon V1b after the movement is performed starting from the own vehicle icon V1b, a cancel command for canceling the traffic lane change instruction command is issued, is illustrated. In (d) of FIG. 23, an example in which, when a flick F1 of the predicted trajectory T1 is performed starting from the predicted trajectory T1, a cancel command for canceling the traffic lane change instruction command is issued, is illustrated.

Figure 24:
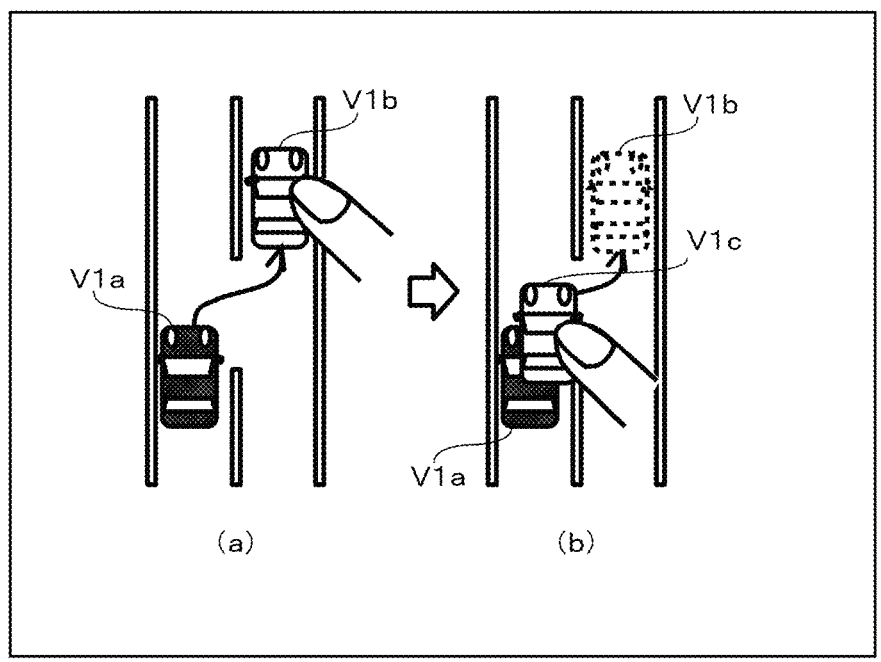
FIG. 24 is a diagram illustrating another example of a gesture operation according to the flowchart of FIG. 22.

FIG. 24 is a diagram illustrating another example of a gesture operation according to the flowchart of FIG. 22. As illustrated in (a) of FIG. 24, when a driver drags the own vehicle icon V1b after the movement, and as illustrated in (b) of FIG. 24, drops the own vehicle icon Vic onto the position of the own vehicle icon before the movement, a cancel command for canceling the traffic lane change instruction command is issued.

Hereinafter, returning to FIG. 5, the details of processing for drawing a predicted trajectory/route candidate in step S9f will be described. The processing described in FIG. 16 and FIG. 17 will be described in more detail.

Figure 25:
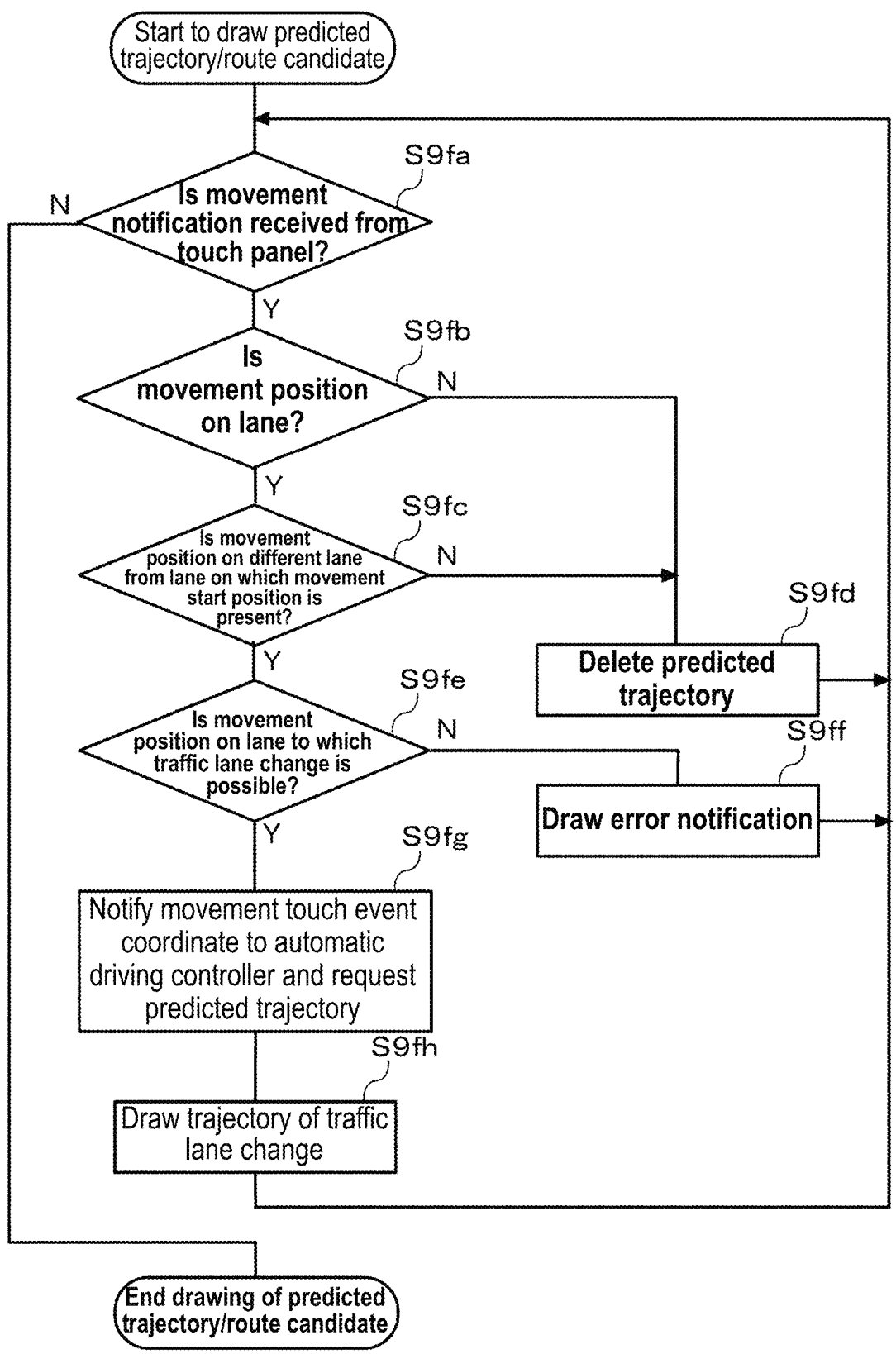
FIG. 25 is a flowchart illustrating an example of processing for drawing a predicted trajectory/route candidate in step S9f of FIG. 5.

FIG. 25 is a flowchart illustrating an example of processing for drawing a predicted trajectory/route candidate in step S9f of FIG. 5. Determination unit 11 of HMI controller 10 determines whether or not a movement notification of the own vehicle icon is received from the touch panel (S9fa). In a case where the movement notification of the own vehicle icon is received (Y in S9fa), determination unit 11 determines whether or not a movement position of the own vehicle icon is on a lane (S9*fb*). In a case where the movement position of the own vehicle icon is on a lane (Y in S9*fb*), determination unit 11 determines whether or not the movement position of the own vehicle icon is on a different lane from a lane on which a movement start position of the own vehicle icon is present (S9*fc*). In a case where the movement position of the own vehicle icon is not on a different lane from a lane on which a movement start position of the own vehicle icon is present (in a case where the movement position of the own vehicle icon is on the same lane as a lane on which a movement start position of the own vehicle icon is present) (N in S9*fc*), generation unit 12 deletes a predicted trajectory in the schematic diagram displayed on the touch panel (S9*fd*). In step S9*fb*, even in a case where the movement position of the own vehicle icon is not on a lane (N in S9*fb*), generation unit 12 deletes a predicted trajectory in the schematic diagram displayed on the touch panel (S9*fd*).

In step S9*fc*, in a case where the movement position of the own vehicle icon is on a different lane from a lane on which the movement start position of the own vehicle icon is present (Y in S9*fc*), determination unit 11 determines whether or not the movement position of the own vehicle icon is on a lane to which a traffic lane change is possible (S9*fe*). In a case where the movement position of the own vehicle icon is not on a lane to which a traffic lane change is possible (N in S9*fe*), generation unit 12 draws an error notification on the touch panel (S9*ff*). In a case where the movement position of the own vehicle icon is on a lane to which a traffic lane change is possible (Y in S9*fe*), instruction unit 13 notifies a coordinate of the touch event on the own vehicle icon to automatic driving controller 20, and requests a predicted trajectory (S9*fg*). Generation unit 12 draws the predicted trajectory of a traffic lane change that is acquired from automatic driving controller 20 on the touch panel (S9*fh*). Until the movement notification of the own vehicle icon is not received from the touch panel (N in S9*fa*), the above processing continues.

Figure 26:
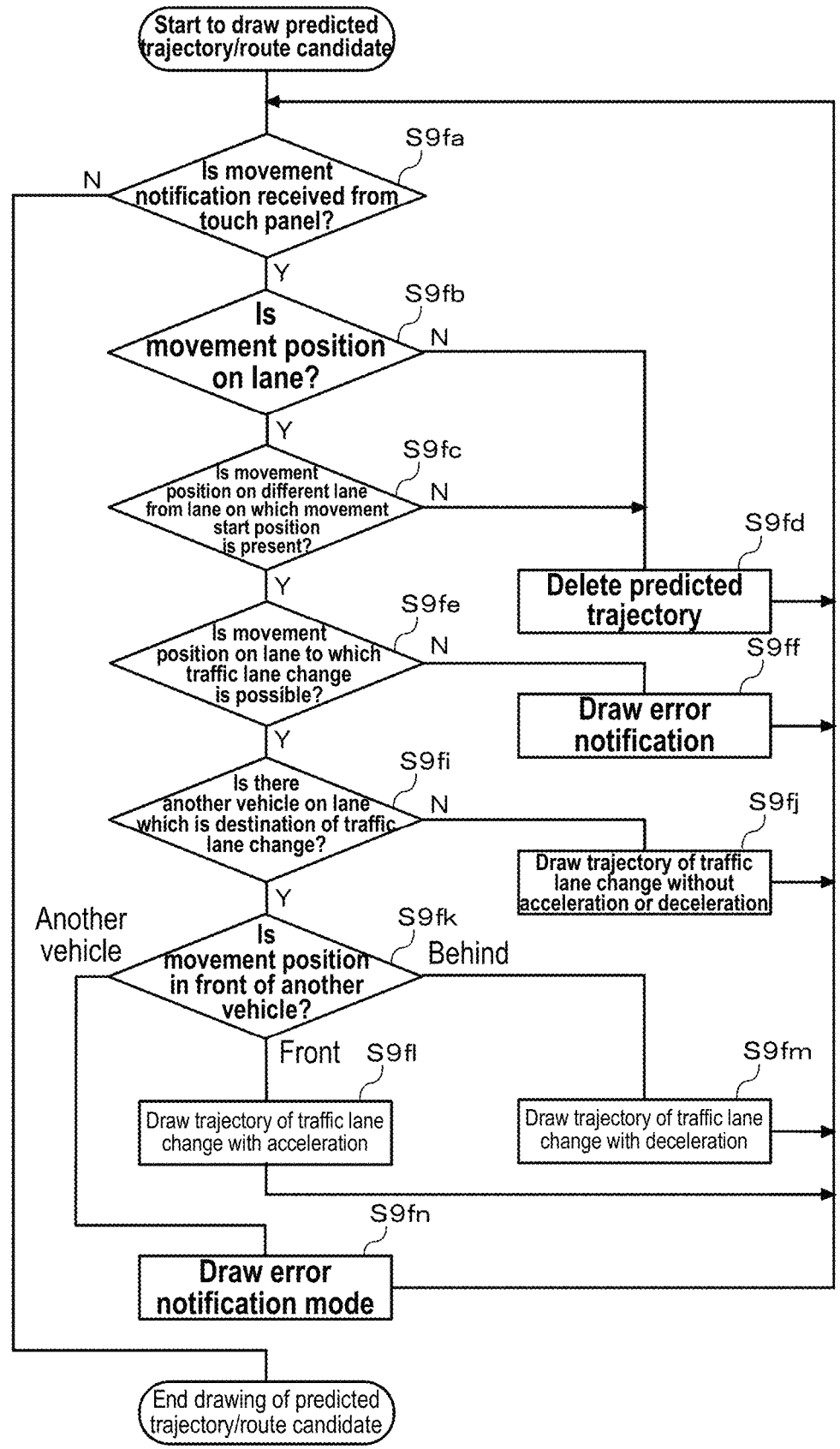
FIG. 26 is a flowchart illustrating another example of processing for drawing a predicted trajectory/route candidate in step S9f of FIG. 5.

FIG. 26 is a flowchart illustrating another example of processing for drawing a predicted trajectory/route candidate in step S9*f* of FIG. 5. Processes from step S9*fa* to step S9*ff* are the same as those of the flowchart of FIG. 25. In a case where the movement position of the own vehicle icon is on a lane to which a traffic lane change is possible (Y in S9*fe*), determination unit 11 determines whether or not there is another vehicle on a lane which is a destination of the traffic lane change (S9*fi*). In a case where there is no another vehicle on a lane which is a destination of the traffic lane change (N in S9*fi*), generation unit 12 draws a predicted trajectory of the traffic lane change without acceleration or deceleration on the touch panel (S9*fj*).

In a case where there is another vehicle on a lane which is a destination of the traffic lane change (Y in S9*fi*), determination unit 11 determines whether or not the movement position of the own vehicle icon is in front of or behind the another vehicle icon (S9*fk*). In a case where the movement position of the own vehicle icon is in front of the another vehicle icon (front in S9*fk*), generation unit 12 draws a predicted trajectory of the traffic lane change with acceleration on the touch panel (S9*fl*). In a case where the movement position of the own vehicle icon is behind the another vehicle icon (behind in S9*fk*), generation unit 12 draws a predicted trajectory of the traffic lane change with deceleration on the touch panel (S9*fm*). In a case where the movement position of the own vehicle icon is in the inside of the another vehicle icon (another vehicle in S9*fk*), generation unit 12 draws an error notification mode on the touch panel (S9*fn*). Until the movement notification of the own vehicle icon is not received from the touch panel (N in S9*fa*), the above processing continues.

Figure 27:
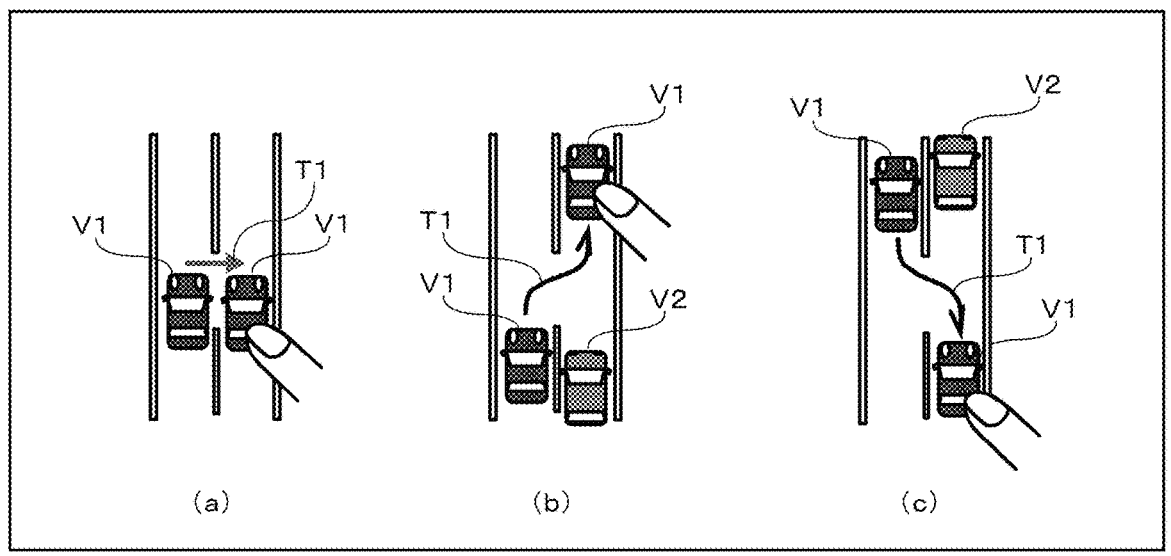
FIG. 27 is a diagram illustrating an example of a gesture operation according to the flowchart of FIG. 26.

FIG. 27 is a diagram illustrating an example of a gesture operation according to the flowchart of FIG. 26. In (a) of FIG. 27, an example of a predicted trajectory of the traffic lane change without acceleration and deceleration in step S9*fj* is illustrated. In (b) of FIG. 27, an example of a predicted trajectory of the traffic lane change with acceleration in step S9*fl* is illustrated. In (c) of FIG. 27, an example of a predicted trajectory of the traffic lane change with deceleration in step S9*fm* is illustrated.

Figure 28:
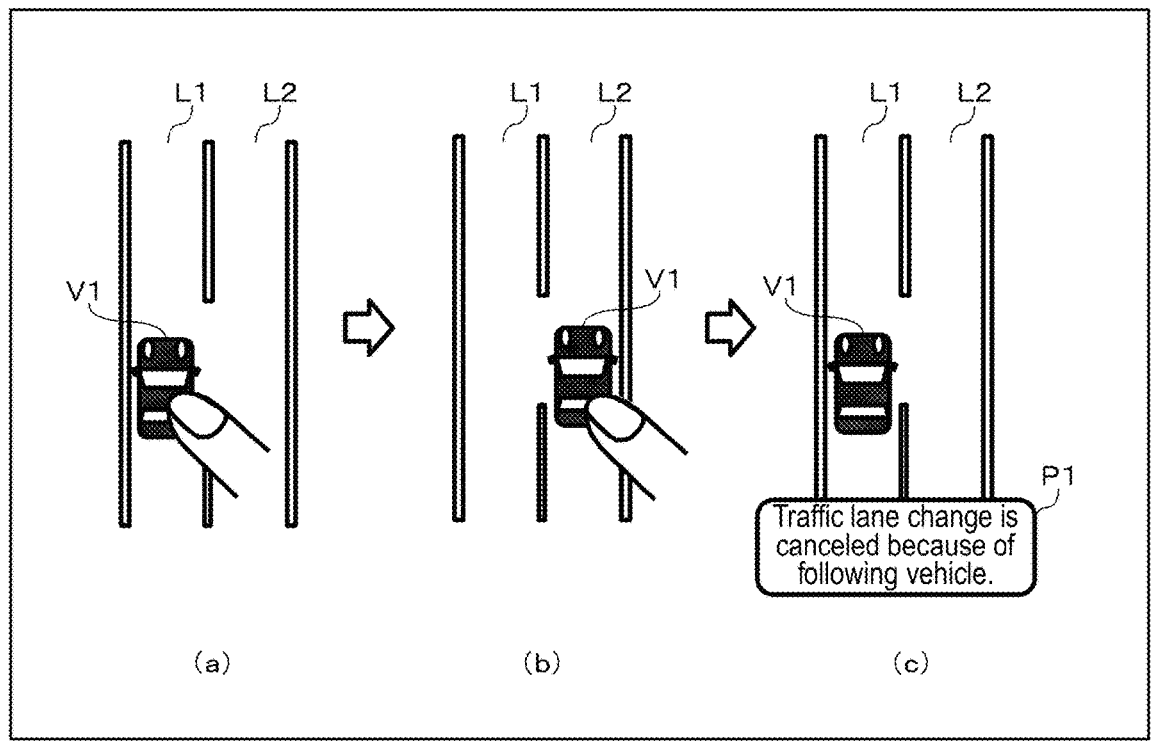
FIG. 28 is a diagram illustrating an example of an error display screen in step S15 of FIG. 4.

FIG. 28 is a diagram illustrating an example of an error display screen. In a case where a driver wants to change the traffic lane of the own vehicle from the first lane L1 to the second lane L2, as illustrated in (a) of FIG. 28, a driver drags the own vehicle icon V1 on the first lane L1. Then, as illustrated in (b) of FIG. 28, a driver drops the own vehicle icon V1 onto the second lane L2. In a case where the approach of another vehicle to the dropped position of the own vehicle icon is detected, as illustrated in (c) of FIG. 28, an error message "The traffic lane change is canceled because of a following vehicle." is displayed in the pop-up window P1, and the own vehicle icon V1 is returned to the first lane L1.

During a period for which the own vehicle icon is dragged and dropped, generation unit 12 may hold the original image (own vehicle icon before movement) in the schematic diagram, and delete the original image when the own vehicle icon is dropped. During the period for which the own vehicle icon is dragged and dropped, generation unit 12 may draw a trajectory of the drag of the own vehicle icon using a dotted line in the schematic diagram. During the period for which the own vehicle icon is dragged and dropped, generation unit 12 may invert the color of the road, and return the color of the road to the original color thereof when the own vehicle icon is dropped. The aspect of the icon being moved such as a color, a shape, or the like may be different from the aspect of the icon before the movement, or may be the same as the aspect of the icon before the movement.

During the period for which the own vehicle icon is dragged and dropped, when there is a drop disable area (an opposite traffic lane or the like) or when an operation (a traffic lane change or the like) is disabled, generation unit 12 may change (invert, thin, or the like) the color of the own vehicle icon. When the own vehicle icon is dropped, the own vehicle icon may return to the original position thereof, and an error message such as "operation disabled" may be displayed. Examples of a case where an operation is disabled includes the approach of a following vehicle, a traffic lane change prohibited area, exceeding of a limiting speed, or the like.

During the period for which the own vehicle icon is dragged and dropped, when an operation is disabled, generation unit 12 may change (invert, thin, or the like) a color of a background such as a road or the like. When an operation is enabled, the color of the background is returned to the original color thereof. During the period for which the own vehicle icon is dragged and dropped, generation unit 12 may change a color of the drop disable area. During the period for which the own vehicle icon is dragged and dropped, when there is a drop disable area or when an operation is disabled, generation unit 12 may perform notification using an error sound or a vibration.

When the drag of the own vehicle icon is started, in a case where the start of an operation is disabled, generation unit 12 may change the color of the own vehicle icon. The drag operation (movement of the own vehicle icon) may be disabled. An error message such as "operation disabled" may be displayed. When the drag of the own vehicle icon is started, in a case where the start of an operation is disabled, generation unit 12 may change the color of the background such as a road or the like. When an operation is enabled, the color of the background is returned to the original color thereof. When the drag of the own vehicle icon is started, in a case where the start of an operation is disabled, generation unit 12 may perform notification using an error sound or a vibration in a state where the drag operation (movement of the own vehicle icon) is disabled.

During a period for which the own vehicle icon is dropped and the own vehicle reaches a target position, generation unit 12 may display a state of the own vehicle during the traffic lane change as a ghost, and display a trajectory of the traffic lane change. During the period for which the own vehicle icon is dropped and the own vehicle reaches a target position, generation unit 12 may change a display state of the own vehicle icon (flashing, a color change, a size, a position, or the like). During the period for which the own vehicle icon is dropped and the own vehicle reaches a target position, determination unit 11 may queue a next instruction as an additional operation (reserve control to be performed after completion of current control). During dragging of the own vehicle icon, at the time of dropping of the own vehicle icon, or during the period for which the own vehicle icon is dropped and the own vehicle reaches a target position, a predicted trajectory is received from automatic driving controller 20, and the predicted trajectory may be drawn on display unit 31. In a case where a traffic lane change is disabled temporarily because there is another vehicle on a lane which is a destination of movement, there is under construction, or there is a traffic lane change disable section, generation unit 12 performs a display such as "trying" until traffic lane change control is established, and may draw a predicted trajectory at a timing at which processing becomes executable. During dragging of the own vehicle icon, or during the period for which the own vehicle icon is dropped and the own vehicle reaches a target position, generation unit 12 may display an estimated required-time or a remaining required-time until the own vehicle icon is dropped and the own vehicle reaches a target position. In a case where traffic lane change control is temporarily disabled, the control may be set in advance to be continued until the control is enabled or suspended and stopped. Since dragging is started accidentally or a cancel operation after dragging is required in some cases, a cancel drop region may be provided. After dragging of the own vehicle, when a driver drops the own vehicle icon onto a cancel drop region, issuing of a command can be cancelled.

As described above, according to the present embodiment, it is possible to transfer the contents of various operations to automatic driving controller 20 by moving an icon displayed on the touch panel by a gesture operation. The gesture operation of moving the icon is a simple operation, and thus a driver is released from a driving operation in the related art such as turning of steering 51, depressing of accelerator pedal 53, or the like. For example, it is possible to easily instruct a traffic lane change by displaying the schematic diagram including multiple lanes and the own vehicle icon and moving the own vehicle icon to another lane. A driver can perform a confirmation of a peripheral situation and an operation instruction on the touch panel at the same time, and thus the sight line of the driver does not move. Accordingly, it is possible to reduce the possibility of an erroneous operation and realize safer driving. In order to issue a traffic lane change instruction command, an operation for linking the own vehicle icon and another lane other than the operation may be used. Although a gesture operation corresponding to a control command is described as a drag-and-drop operation or the like, a touch-and-touch operation may be used. A predetermined gesture or operation is preferably used, but an operation that is customizable by a driver may be used. Further, in order to recognize the corresponding relationship of a gesture operation and a control command, a comment, an icon, or an arrow may be displayed by display unit 31, or a guide display or voice guidance may be provided by display unit 31.

As above, the present disclosure has been described based on the embodiments. These embodiments have been presented by way of example only, and it should be understood by those skilled in the art that the embodiments can be modified in various forms by combining the respective elements or processing processes, and the modification examples are included in the scope of the present disclosure.

For example, although an example in which HMI controller 10 is implemented by a dedicated LSI is assumed, functions of HMI controller 10 may be realized using a central processing unit (CPU) in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

The embodiments related to the present disclosure may have features shown in the following items.

[Item 1]

A driving support device (10) according to the present disclosure includes: an image output unit (14a) that outputs, to a display unit (31), an image containing an own vehicle object representing an own vehicle and a plurality of traffic lanes; an operation signal input unit (14b) that receives an operation of a user for moving the own vehicle object in the image displayed on the display unit (31) from a first traffic lane to a second traffic lane; and a command output unit (14c) that outputs, to an automatic driving control unit (20) that controls automatic driving, a command for instructing the change of a traveling traffic lane of the own vehicle from the first traffic lane to the second traffic lane when the operation is received.

In this case, a user can intuitively and conveniently perform an operation for instructing the traffic lane change.

[Item 2]

The driving support device (10) of the present disclosure has the following features in addition to the features shown in Item 1.

In other words, the image output unit (14a) outputs, to the display unit (31), an image containing an another vehicle object representing another vehicle in the second traffic lane when the another vehicle is traveling on the second traffic lane. The command output unit (14c) outputs, to the automatic driving control unit (20), a command for instructing the change of the traveling traffic lane of the own vehicle from the first traffic lane to the second traffic lane in front of the another vehicle when the own vehicle object has been moved to the second traffic lane in front of the another vehicle object. The command output unit (14c) further outputs, to the automatic driving control unit (20), a command for instructing the change of the traveling traffic lane of the own vehicle from the first traffic lane to the second traffic lane behind the another vehicle when the own vehicle object has been moved to the second traffic lane behind the another vehicle object.

In this case, at the time of the change of the traveling traffic lane of the own vehicle, it is possible to intuitively and conveniently instruct the own vehicle to move to the front or the behind of another vehicle.

[Item 3]

The driving support device (10) of the present disclosure has the following features in addition to the features shown in Item 1 or Item 2.

In other words, the command output unit (14c) outputs, to the automatic driving control unit (20), a command for canceling the command for instructing the change of the traveling traffic lane of the own vehicle from the first traffic lane to the second traffic lane when the own vehicle object has been moved to the first traffic lane within a predetermined time after the own vehicle object had been moved to the second traffic lane.

In this case, it is possible to intuitively and conveniently perform an operation for canceling the traffic lane change.

[Item 4]

The driving support device (10) of the present disclosure has the following features in addition to the features shown in any one of Items 1 to 3.

In other words, the command output unit (14c) outputs, to the automatic driving control unit (20), a command for instructing the own vehicle to turn right when the own vehicle object is located outside of the plurality of traffic lanes and has been moved to the right side of the plurality of traffic lanes, and outputs, to the automatic driving control unit (20), a command for instructing the own vehicle to turn left when the own vehicle object is located outside of the plurality of traffic lanes and has been moved to the left side of the plurality of traffic lanes.

In this case, it is possible to intuitively and conveniently perform a right turn operation or a left turn operation.

[Item 5]

The driving support device (10) of the present disclosure has the following features in addition to the features shown in any one of Items 1 to 4.

In other words, when the operation signal input unit (14b) receives an operation of a user for touching the own vehicle object in the image displayed on the display unit (31), the image output unit (14a) outputs, to the display unit (31), an image containing at least one driving operation candidate object representing at least one driving operation candidate that can be executed by the own vehicle based on a peripheral situation of the own vehicle.

In this case, a user can intuitively and conveniently perform an operation by only selecting a driving operation candidate object, and it is possible to suppress erroneous operations.

[Item 6]

In the driving support device (10) of the present disclosure, in addition to the features shown in any one of Items 1 to 5, the image output unit (14a) outputs, to the display unit (31), an image containing a trajectory from a position before changing the traveling traffic lane of the own vehicle object to a position after changing the traveling traffic lane.

In this case, a user can recognize a trajectory of the traffic lane change.

[Item 7]

A driving support device system (10, 30) according to the present disclosure includes: a display device (30) that displays an image; and a driving support device (10) that outputs an image on the display device (30). The driving support device (10) includes: an image output unit (14a) that outputs, to the display device (30), an image containing an own vehicle object representing an own vehicle and a plurality of traffic lanes; an operation signal input unit (14b) that receives an operation of a user for moving the own vehicle object in the image displayed on the display device (30) from a first traffic lane to a second traffic lane; and a command output unit (14c) that outputs, to an automatic driving control unit (20) that controls automatic driving, a command for instructing the change of a traveling traffic lane of the own vehicle from the first traffic lane to the second traffic lane when the operation is received.

In this case, a user can intuitively and conveniently perform an operation for instructing the traffic lane change.

[Item 8]

A driving support method according to the present disclosure includes: a step of outputting, to a display unit (31), an image containing an own vehicle object representing an own vehicle and a plurality of traffic lanes; a step of receiving an operation of a user for moving the own vehicle object in the image displayed on the display unit (31) from a first traffic lane to a second traffic lane; and a step of outputting, to an automatic driving control unit (20) that controls automatic driving, a command for instructing the change of a traveling traffic lane of the own vehicle from the first traffic lane to the second traffic lane when the operation is received.

In this case, a user can intuitively and conveniently perform an operation for instructing the traffic lane change.

[Item 9]

A driving support program according to the present disclosure for causing a computer to execute: processing to output, to a display unit (31), an image containing an own vehicle object representing an own vehicle and a plurality of traffic lanes; processing to receive an operation of a user for moving the own vehicle object in the image displayed on the display unit (31) from a first traffic lane to a second traffic lane; and processing to output, to an automatic driving control unit (20) that controls automatic driving, a command for instructing the change of a traveling traffic lane of the own vehicle from the first traffic lane to the second traffic lane when the operation is received.

In this case, a user can intuitively and conveniently perform an operation for instructing the traffic lane change.

[Item 10]

An automatic drive vehicle (1) according to the present disclosure includes: an image output unit (14a) that outputs, to a display unit (31), an image containing an own vehicle object representing an own vehicle and a plurality of traffic lanes; an operation signal input unit (14b) that receives an operation of a user for moving the own vehicle object in the image displayed on the display unit (31) from a first traffic lane to a second traffic lane; a command output unit (14c) that outputs a command for instructing the change of a traveling traffic lane of the own vehicle from the first traffic lane to the second traffic lane when the operation is received; and an automatic driving control unit (20) that executes the output command.

In this case, a user can intuitively and conveniently perform an operation for instructing the traffic lane change.

The present disclosure can be used in a vehicle equipped with automatic driving mode.

The invention claimed is:

1. A driving support device comprising:
an image output unit, which, in operation, outputs, to a display unit, an image including an own vehicle object representing an own vehicle, and a plurality of traffic lanes representing at least a first traffic lane and a second traffic lane;

an operation signal input unit, which, in operation, receives an operation of a user moving the own vehicle object in the image displayed on the display unit from a traffic lane representing the first traffic lane to a traffic lane representing the second traffic lane; and a command output unit, which, in operation, outputs, to an automatic driving control unit that controls automatic driving of the own vehicle, a command for instructing a change of a traveling traffic lane of the own vehicle from the first traffic lane to the second traffic lane in response to the operation being received, wherein the image output unit, in operation, outputs to the display unit, an image containing a trajectory from a position of the own vehicle object before changing the traveling traffic lane to a position after changing the traveling traffic lane during execution of the command.

2. The driving support device according to claim 1, wherein the image output unit outputs, to the display unit, an image containing an another vehicle object representing another vehicle in the traffic lane representing the second traffic lane, when the another vehicle is traveling on the second traffic lane, the command output unit outputs, to the automatic driving control unit, a command for instructing a change of the traveling traffic lane of the own vehicle from the first traffic lane to the second traffic lane in front of the another vehicle in response to the own vehicle object being moved to the traffic lane representing the second traffic lane in front of the another vehicle object, and the command output unit outputs, to the automatic driving control unit, a command for instructing a change of the traveling traffic lane of the own vehicle from the first traffic lane to the second traffic lane behind the another vehicle in response to the own vehicle object being moved to the traffic lane representing the second traffic lane behind the object.

3. The driving support device according to claim 1, wherein the command output unit outputs, to the automatic driving control unit, a command for canceling the command for instructing the change of the traveling traffic lane of the own vehicle from the first traffic lane to the second traffic lane in response to the own vehicle object has been moved to the traffic lane representing the first traffic lane within a predetermined time after the own vehicle object had been moved to the traffic lane representing the second traffic lane.

4. The driving support device according to claim 1, wherein the command output unit outputs, to the automatic driving control unit, a command for instructing the own vehicle to turn right in response to the own vehicle object being located outside of the plurality of traffic lanes and being moved to a right side of the plurality of traffic lanes, and the command output unit outputs, to the automatic driving control unit, a command for instructing the own vehicle to turn left in response to the own vehicle object being located outside of the plurality of traffic lanes and being moved to a left side of the plurality of traffic lanes.

5. The driving support device according to claim 1, wherein, in response to the operation signal input unit receiving an operation of the user touching the own vehicle object in the image displayed on the display device, the image output unit outputs, to the display unit, an image containing at least one driving operation candidate object representing at least one driving operation candidate that can be executed by the own vehicle based on a peripheral situation of the own vehicle.

6. A driving support system comprising:

a display device, which, in operation, displays an image; and a driving support device, which, in operation, outputs the image to the display device, the driving support device including:

an image output unit, which, in operation, outputs, to the display device, an image including an own vehicle object representing an own vehicle, and a plurality of traffic lanes representing at least a first traffic lane and a second traffic lane;

an operation signal input unit, which, in operation, receives an operation of a user moving the own vehicle object in the image displayed on the display device from a traffic lane representing the first traffic lane to a traffic lane representing the second traffic lane; and a command output unit, which, in operation, outputs, to an automatic driving control unit that controls automatic driving of the own vehicle, a command for instructing a change of a traveling traffic lane of the own vehicle from the first traffic lane to the second traffic lane in response to the operation being received, wherein the image output unit, in operation, outputs to the display unit, an image containing a trajectory from a position of the own vehicle object before changing the traveling traffic lane to a position after changing the traveling traffic lane during execution of the command.

7. A driving support method comprising:

outputting, to a display unit, an image containing an own vehicle object representing an own vehicle, and a plurality of traffic lanes representing at least a first traffic lane and a second traffic lane;

receiving an operation of a user moving the own vehicle object in the image displayed on the display unit from a traffic lane representing the first traffic lane to a traffic lane representing the second traffic lane; and outputting, to an automatic driving control unit that controls automatic driving, a command for instructing a change of a traveling traffic lane of the own vehicle from the first traffic lane to the second traffic lane in response to the operation being received, outputting, to the display unit, an image containing a trajectory from a position of the own vehicle object before changing the traveling traffic lane to a position after changing the traveling traffic lane during execution of the command.

* * * * *